United States Patent [19]

Henze

[11] Patent Number: 4,725,940
[45] Date of Patent: Feb. 16, 1988

[54] QUANTIZED DUTY RATIO POWER SHARING CONVERTERS

[75] Inventor: Christopher P. Henze, Eagan, Minn.

[73] Assignee: Unisys Corporation, Blue Bell, Pa.

[21] Appl. No.: 60,193

[22] Filed: Jun. 10, 1987

[51] Int. Cl.⁴ .............................................. H02M 7/00
[52] U.S. Cl. ...................................... 363/72; 363/41; 323/285; 318/610; 364/162
[58] Field of Search .................. 363/41, 43, 71, 72; 323/282, 283, 285; 364/161, 162, 163; 318/609, 610

[56] References Cited

U.S. PATENT DOCUMENTS

| 4,094,959 | 6/1978 | Ball et al. | 364/161 |
| 4,149,233 | 4/1979 | Frosch | 363/71 |
| 4,150,425 | 4/1979 | Frosch | 363/56 |
| 4,268,784 | 5/1981 | Ganaway | 364/162 |
| 4,600,870 | 7/1986 | Martin | 318/610 |
| 4,630,187 | 12/1986 | Henze | 323/285 |

Primary Examiner—Patrick R. Salce
Assistant Examiner—Anita M. Ault
Attorney, Agent, or Firm—Glenn W. Bowen; Laurence J. Marhoefer

[57] ABSTRACT

A pair of quantized duty ratio proportional-integral-differential (PID) converters are coupled to provide power sharing to a load. One of the converters is a master and the other is a slave, and a PID controller is coupled to both of the converters. The PID controller also supplies two digital offset signals to the converters during normal operation, which insures load sharing by control of the duty ratio of the converters. If one of the converters fails, a sensor control unit switches control to the other unit and the digital offset signal goes to zero.

10 Claims, 23 Drawing Figures

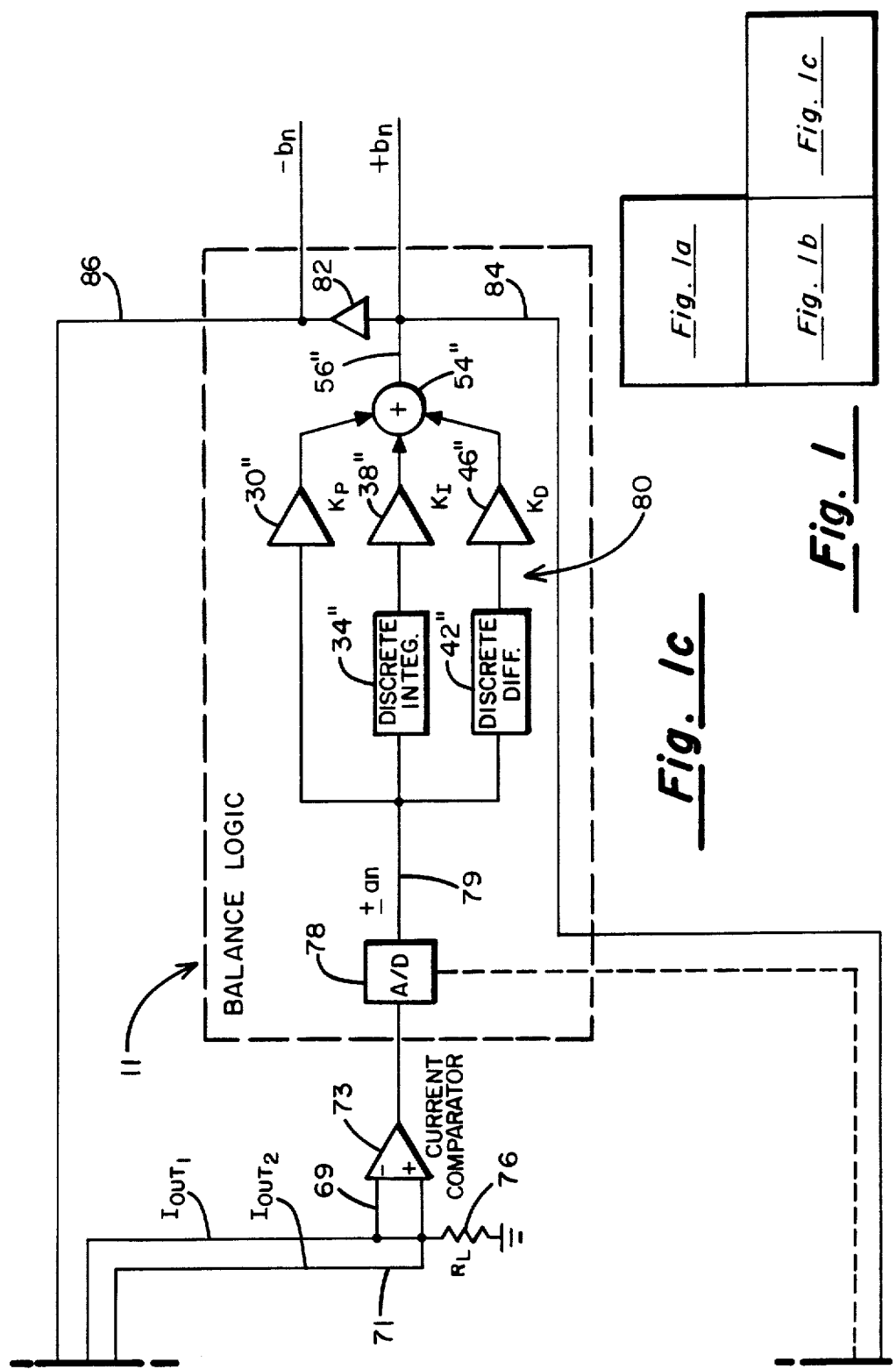

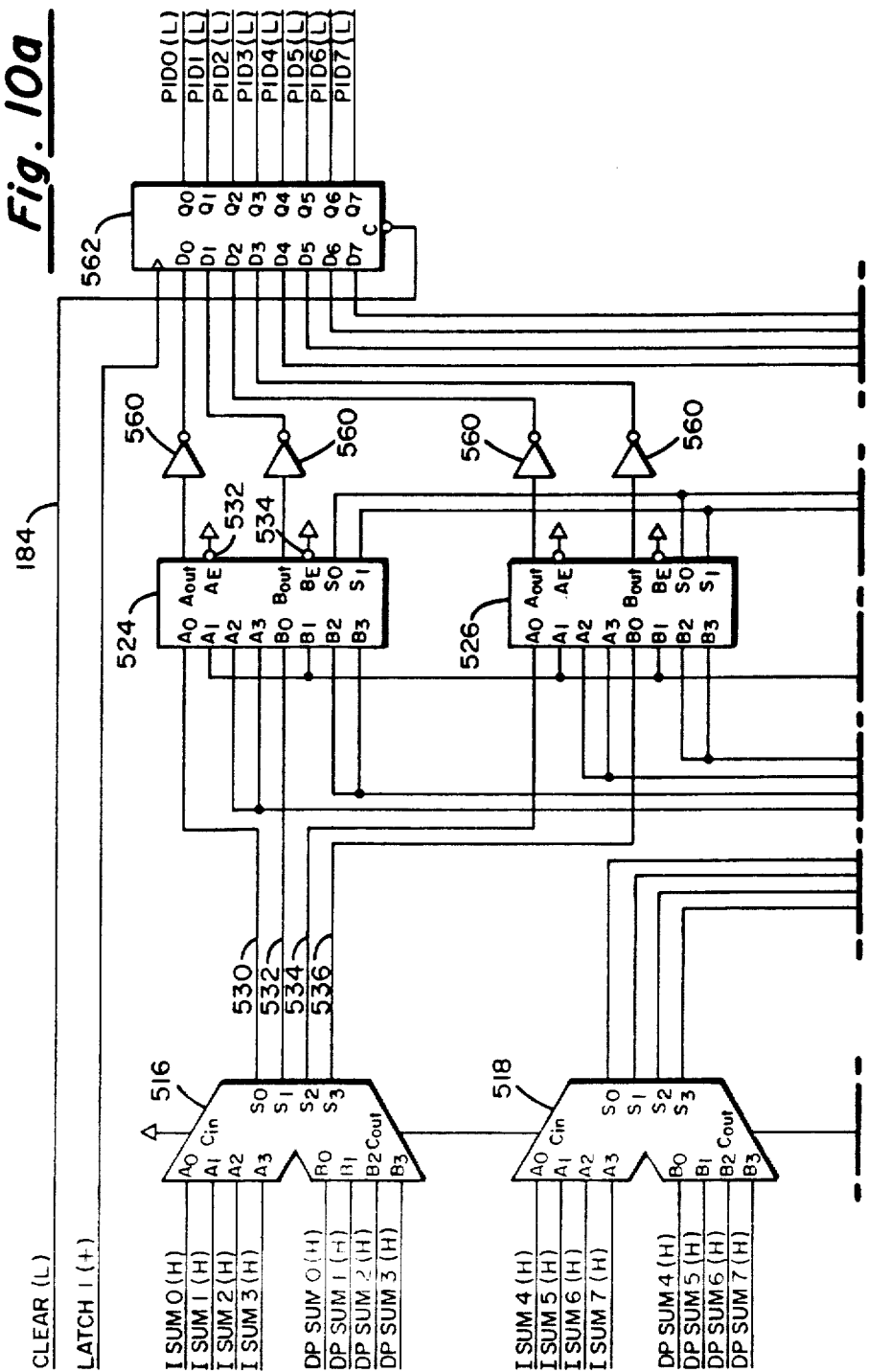

QUANTIZED DUTY RATIO POWER SHARING CONVERTERS

BACKGROUND OF THE INVENTION

This invention relates to load sharing between redundant power converters, and more particularly to quantized duty ratio load sharing power converters. Redundant load sharing techniques can be used to improve power converter system reliability if two or more power converters are coupled to normally provide power to a single load. Each of the power converters has the output capability of supporting the entire load itself.

When power converters are coupled in parallel, a number of design problems typically result. First of all, a failure in one power converter must not degrade the operation of the second power converter. Also, when the converters are operating in parallel, they must share the load equally within a very small percentage, desirably on the order of 3% or less. Another desirable feature is to have the capability of being able to utilize independent primary power sources for each of the power supplies. In addition, the regulation characteristics of the power converters in parallel must not be degraded.

Conventional power converters use an analog error amplifier, compensated to provide the desired dynamic response, in conjunction with a ramp driven comparator to generate the switching control waveforms for the power switching transistors. Digital power converter controllers have been developed that are based on a digitization of this analog control architecture. This class of controller, although implemented with digital circuits, is capable of generating a continuously variable duty ratio. The digital control architecture described herein is based on a duty ratio quantization technique where the duty ratio of the power transistors is only allowed to take on certain discrete values. To provide dynamic regulation, the duty ratio value is updated each switching cycle by performing calculations on data obtained by sampling the output voltage of the power converter with a digital error amplifier.

Digital control based on duty ratio quantization offers several advantages over conventional analog control. Since digital filter techniques are used for dynamic regulation, and the sampling frequency of the digital filter is equal to the switching frequency of the power converter, the quantized duty ratio digital controller may be used at any switching frequency without requiring recompensation. Dynamic regulation characteristics are easily altered by the selection of digital weighting coefficients, and the basic digital controller is easily modified to include special functions such as output current limiting and soft-start. Computer simulation may easily be accomplished since the action of the power switching transistors is always defined one cycle in advance.

A theoretical disadvantage of duty ratio quantization is that low frequency quantization noise is produced in the output of the converter. However, if a sufficiently small quantization level is used for duty ratio generation, the quantization noise may be reduced to a level well below the switching ripple.

Power converter controllers that use digital proportional-integral-differential (PID) feedback are shown in the following papers:

N. R. Miller, "A Digitally Controlled Switching Regulator," PESC Record, 1977

V. B. Boros, "A Digital Proportional Integral, and Derivative Feedback Controller for Power Conditioning Equipment," PESC Record 1977

H. Matsuo and F. Kurokawa, "Regulation Characteristics of the Digitally Controlled DC-DC Converter," PESC Record, 1983

T. V. Papathomas and J. N. Giacopelli, "Digital Implementation and Simulation of an Average Current Controlled Switching Regulator," PESC Record, 1979.

These schemes use a voltage-controlled-oscillator to measure the error in the signal output that is to be regulated. Hence, the duty ratio is a continuous variable and varies in response to changes in the average output voltage from one switching cycle to the next.

In R. Bruckner and I. Khamare, "Optimizing Converter Design and Performance Utilizing Micro Controller System Feedback and Control," Proceedings Powercon 8, 1981, a digitally controlled power converter is described that uses a quantized duty ratio technique but not PID control. With this type of controller, the output signal is sampled with an analog-to-digital converter and the duty ratio is calculated one cycle in advance based on the sampled data.

The digitally controlled power converter used in the present invention uses both PID control and duty ratio quantization. PID control is desirable because it offers very good regulation. In addition to good regulation characteristics a practical power converter for many applications must have output current limiting, soft-start, undervoltage lockout and overvoltage shutdown. The digitally controlled PID power converter used in the present invention has all of these special functions. The soft-start function changes the digital weighting coefficients of the controller during power-up. The only external signal that is required is a logic "edge" to initiate the function. This method is not practical with analog control because it would require many extra components.

The described controller also has undervoltage lockout and overvoltage shutdown functions. These functions cause the controller to be "cleared," thereby forcing the duty ratio to go to zero as long as the input voltage is too low, or any of the output voltages are too high.

Power converter with duty ratio quantization which is utilizable in conjunction with related control circuitry is shown in U.S. Pat. No. 4,630,187 issued Dec. 16, 1986 and entitled "Power Converter with Duty Ratio Quantization." The inventor of this patent is Christopher P. Henze, the inventor of the present invention, and the assignee is Unisys Corporation, the successor to Sperry Corporation.

BRIEF DESCRIPTION OF THE DRAWINGS

The present invention is described by reference to the drawings in which:

FIG. 1 is a diagram which shows how FIGS. 1a, 1b and 1c are placed to form a block diagram of the parallel quantized duty ratio power converter of the present invention;

FIGS. 1a, 1b and 1c represent the block diagram of the load sharing power converters;

DESCRIPTION OF THE INVENTION

Figure 1A:
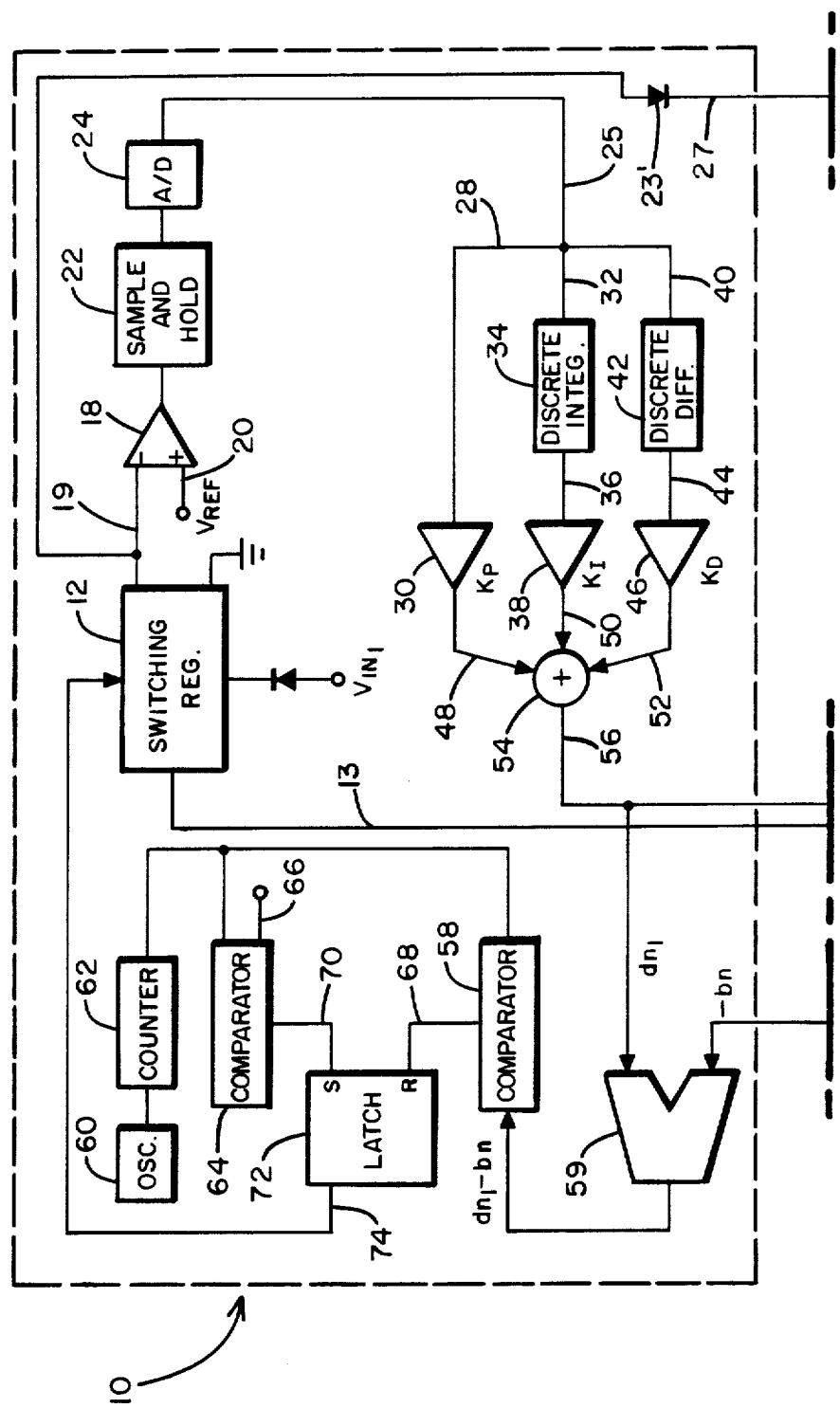
Figure 1B:
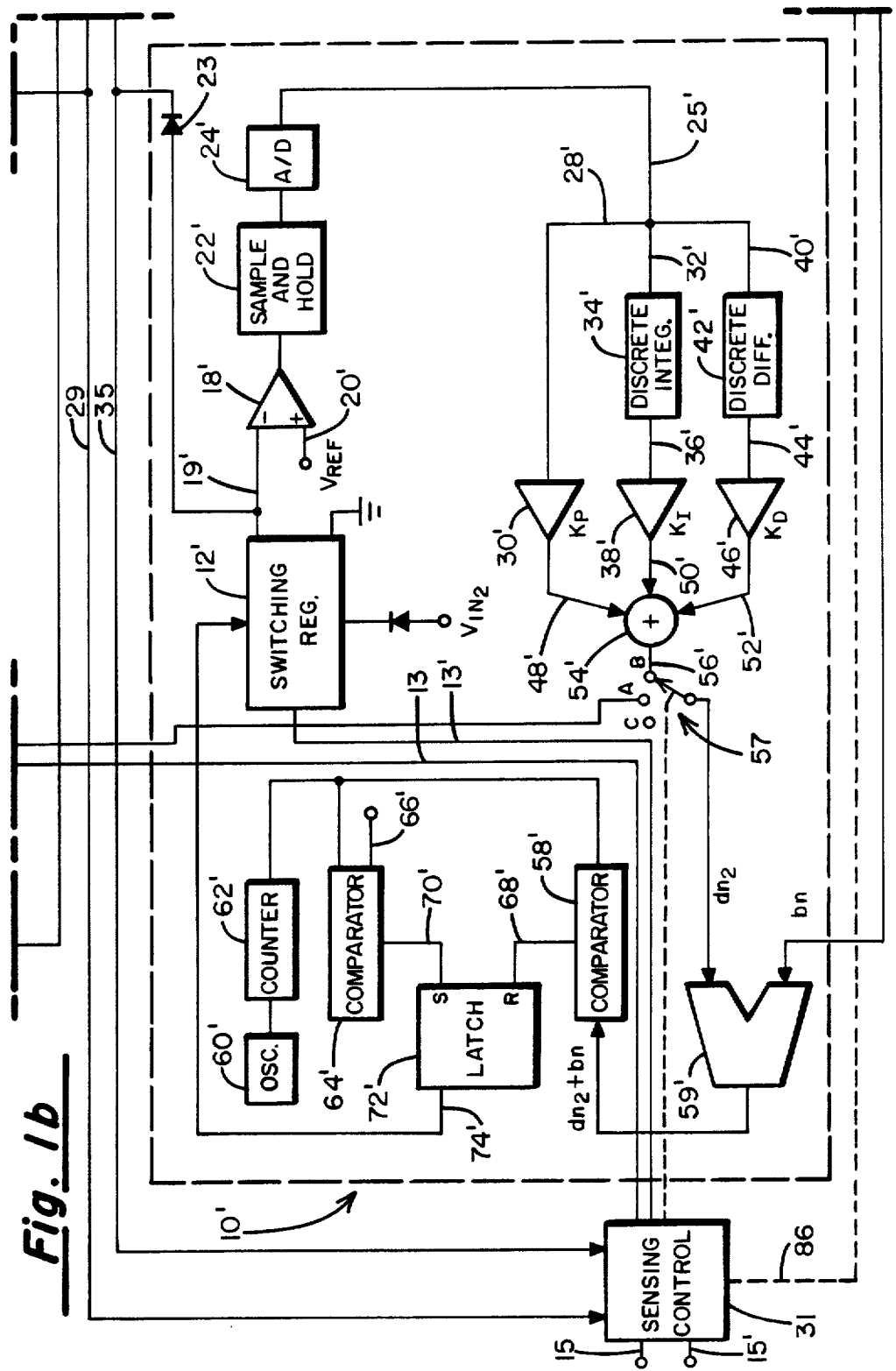
Figure 2:
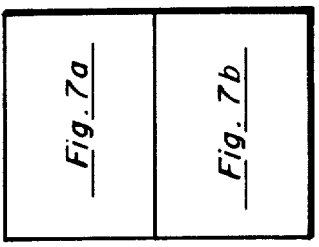
FIG. 2 is a map of the orientation of FIGS. 3–12.
Figure 2:
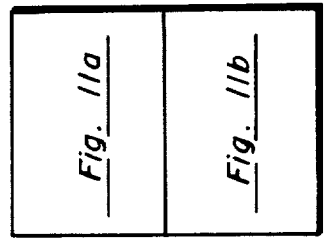
Figure 2:
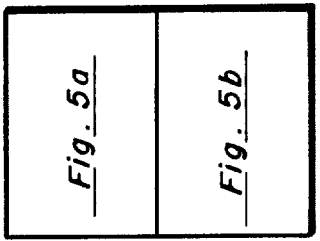
Figure 2:
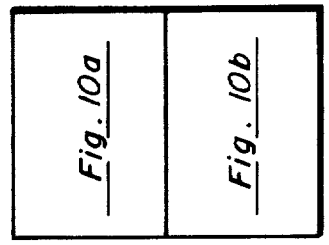
Figure 2:
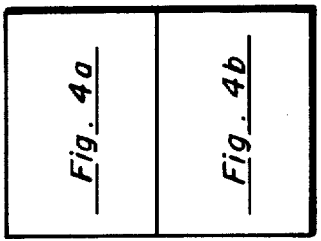
Figure 2:
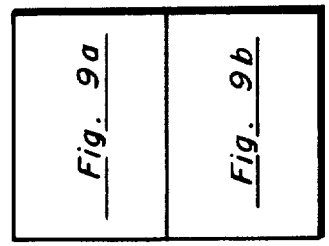
Figure 2:
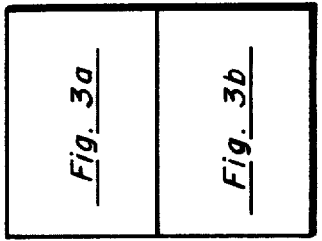
Figure 2:
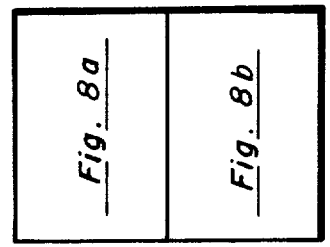
Figure 3A:
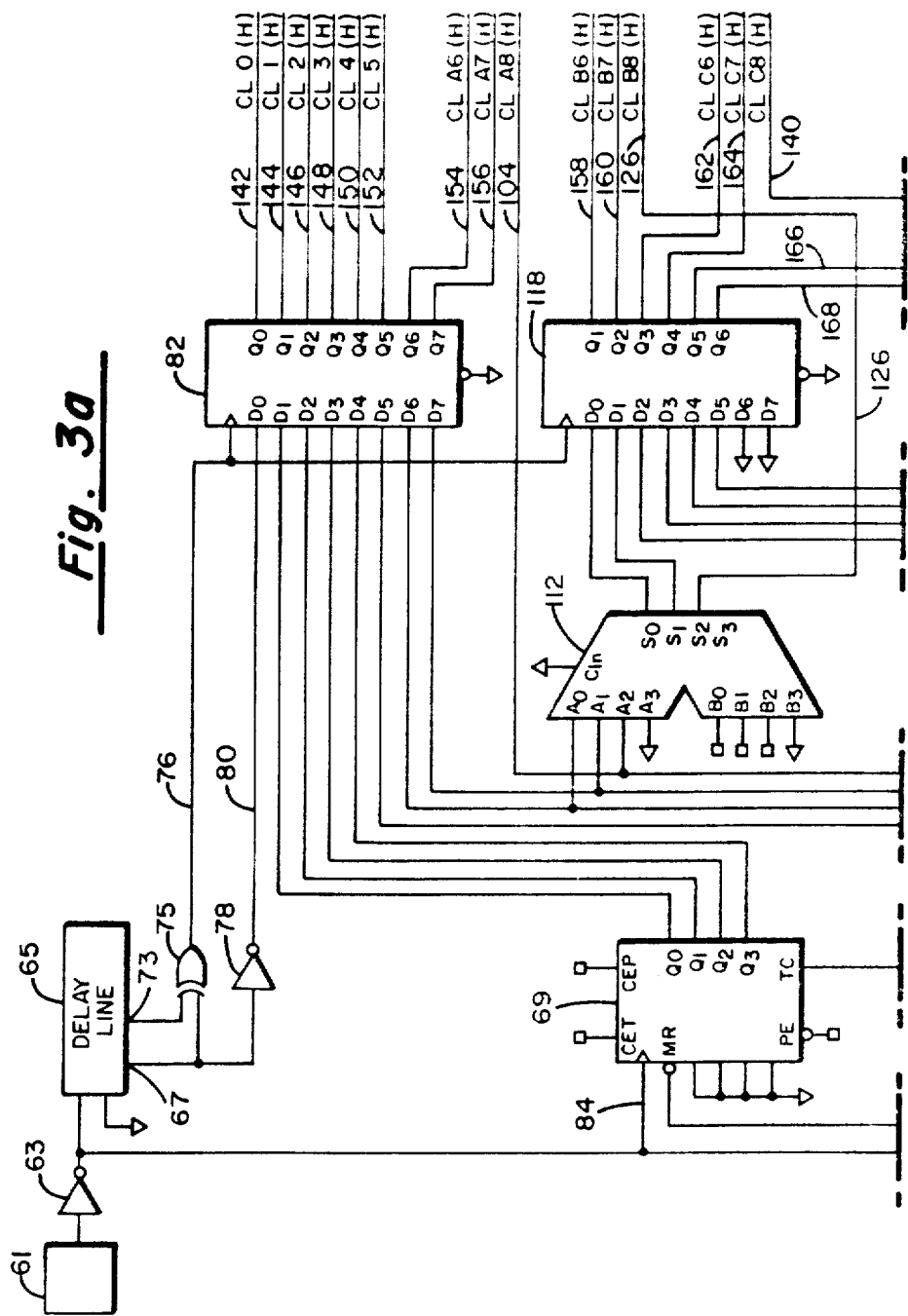
FIGS. 3–12 are a detailed block diagram of a particular embodiment of the present invention.
Figure 3B:
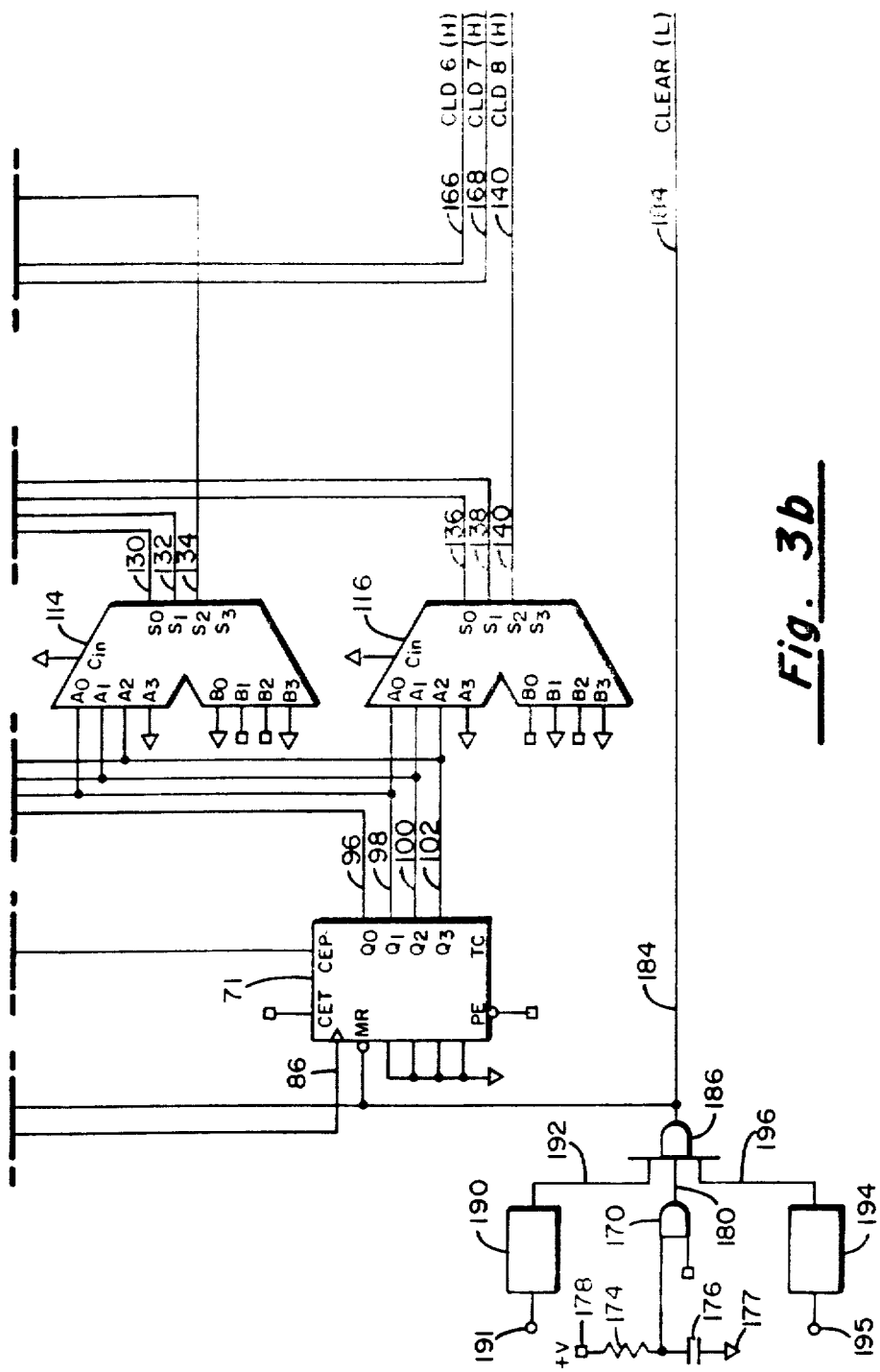

As shown in FIGS. 1a, 1b and 1c, two digitally controlled power converters 10, 10' are interconnected to implement redundant power conversion. The two power converters are constructed in an identical manner, but during normal operation they are operated in a master/slave relationship to insure that the load current will be shared equally. Though only two power converters are shown, additional power converters may be coupled in parallel to provide triple, or higher level, redundancy. If one of the power converters, or one the primary power sources should fail, the master/slave relationship will be terminated and the remaining power converter(s) will provide power to the load.

If one of the power converters should fail, it is essential that the operational capability of the other converter not be degraded. Diode isolation may be used at the input and output terminals of the power converters to isolate internal failures. If interleaved flyback topology is utilized, this will inherently provide an isolated output. (Diode isolation at the input terminals is a commonly employed feature for redundant bus applications.)

Digital information describing the instantaneous status of each power converter is examined during each switching cycle for abnormal operation. If abnormal operation is detected, such as the onset of current limiting or undervoltage lockout, the master/slave relationship is terminated and the faulty power converter is shut down. During parallel operation, the digital current balancing technique insures that the load current will be shared equally by the two power converters without affecting the closed-loop voltage regulation characteristics. Since the required logic is easily included into the digital controller gate-array, only a single comparator must be added to the power converter to implement digital current balancing.

In the digitally controlled power converter, a quantized duty ratio value ($d_n$) is calculated each switching cycle to maintain output voltage regulation. To implement digital current balancing, a digital offset value ($b_n$) is also calculated each switching cycle and used to adjust the duty ratios used in the master and slave power converters where $$d_n(\text{master}) = d_n - b_n$$

$$d_n(\text{slave}) = d_n + b_n$$

The quantized duty ratio value is calculated only by the master power converter and passed to the slave power converter. The offset value is calculated, also in the master power converter, from a single output bit of the current comparator using a discrete proportional-integral technique. The function of the current comparator is to indicate if the current in the master power converter is greater than or less than the current in the slave power converter at each sampling instant.

Since the instantaneous average duty ratio used in the two converter system is independent of the offset value, $$d_n(\text{average}) = \frac{(d_n - b_n) + (d_n + b_n)}{2} = d_n$$

The operation of the digital current balancing loop is transparent to the main digital voltage regulation loop. Furthermore, since a discrete integrator is included in the balancing logic, a wide deviation in input voltage or internal component values is accommodated. Proportional and integral weighting coefficients may be adjusted to select the desired transient response and guarantee closedloop stability.

Discrete proportional-integral-differential (PID) controllers provide output voltage regulation in the digitally controlled power converters of the present invention. Prior to the start of each switching cycle, an updated quantized duty ratio value $d_n$ is calculated from a weighted summation of: a digital input error signal $e_n$, the discrete integral of the error signal $y_n$, and the discrete difference of the error signal $x_n$.

A digital error signal $e_n$, describing the difference between the actual output voltage and a reference voltage, is used as the input to the digital feedback controller. This digital error may be positive or negative and is obtained by sampling and digitizing, during each switching cycle, the output voltage of an uncompensated analog error amplifier. An 8-bit analog-to-digital (A/D) converter is used in the digital error amplifier. Twos complement representation allows the digital error to range from $-128$ to $+127$, which corresponds to a sampled output voltage range of approximately 4.64 V to 5.36 V.

A simple approximation to the continuous operation of integration is obtained by summing all past error values to obtain:

$$Y_n = e_n + e_{n-1} + \ldots + e_o$$

This relationship may be expressed as a discrete time difference equation by:

$$y_n = y_{n-1} + e_n$$

An adder and a register are used to form a discrete integrator to implement the function described in the above equation. The error $e_n$ and the previous sum $y_{n-1}$ are added to yield the new sum $y_n$. When the result is no longer needed, and before the next error $e_{n+1}$ is obtained, the register must be updated with the current sum $y_n$ (which will become the previous sum in the next switching cycle).

Discrete differentiation of the digital error input is obtained by subtracting the previous error from the present error.

$$x_n = e_n - e_{n-1}$$

For a hardware realization of a discrete differentiator an adder and a register are required. Since a twos complement number may be negated by inversion and addition of a binary one, subtraction of the previous error is accomplished in the described embodiment by using an inverting register and forcing a carry into the adder. As with the integrator circuit, the register must be updated at the appropriate time so that the present error may be saved until the next switching cycle so as to become the new "previous error."

Multiplicative constants $K_P$, $K_I$ and $K_D$ may be used to adjust the relative contribution of the three control branches for the duty ratio calculation. In general, high speed digital multiplication by arbitrary constants is very hardware intensive; however, if the constants are restricted to powers of two, multiplication may be implemented with the shift-left operations, and integer division may be implemented with the shift-right operations. In the described digital PID control circuit, four externally programmable coefficients for the weighting of both the integral and differential branches are provided. The choices were: $K_I = \frac{1}{8}$, 1/16, 1/32 and 1/64; and $K_D = 0$, 1, 2 and 4. $K_P$ is equal to 1, although it could also assume other values, if desired. When $K_D = 0$ the controller operates with only proportional-integral (PI) feedback control. This feature may be used to examine the effect of differential control on the closed-loop system.

The quantized duty ratio value to be used in the nth switching cycle is given by the weighted sum of the outputs of the three control branches.

$$d_n = e_n K_P + Y_n K_I + X_n K_D$$

The quantized duty ratio $d_n$ must always be a positive number and is represented by an M-bit binary number. Overflow/underflow detection and correction is used to set dN to: zero if underflow occurs, and the maximum value of $2^{M-1}$ if overflow occurs. The actual duty ratio $D_N$ of the power switching transistor during the nth cycle, assuming a single phase power converter where the duty ratio may range from zero to one, (i.e., where the converter supplies a step-down transformer without isolation) is $$D_n = \frac{d_n}{2^M} \text{ for } 0 \leq d_n \leq 2^{M-1}$$

In a dual phase configuration, where one power transistor must be off during the entire switching cycle that the other power transistor is active, the actual dual ratio of an individual power transistor is half of the above value.

A high speed synchronous digital counter is used to generate the drive waveforms for the power switching transistors. The digital counter must also be M-bits wide and provide $2^M$ equally spaced discrete points within the switching period at which the power transistors may be turned off. With a single phase power converter, the power transistor is turned on each time the digital counter rolls-over to zero. In a dual phase converter, alternating power transistors are turned on each time the digital counter rolls-over to zero. The power transistors are turned off when the digital counter has reached a count that is equal to the value of $d_n$. If $d_n$ has a value of zero for a particular switching cycle, the power transistor will remain off for the entire cycle.

In the illustrated system an 8-bit binary representation is used for the quantized duty ratio allowing $d_n$ to range (in decimal) from 0 to 255. The corresponding duty ratio resolution is approximately 0.4% in a single phase system.

The power converters used in the present invention may perform a number of specialized functions. These functions may include output current limiting, soft-start, undervoltage lockout, overvoltage shut-down and power master-clear indication. the output current of the power converter may be limited by dynamically altering the digital error input signal to the PID controller. To provide voltage regulation, the digital error from the A/D converter is routed into the PID controller through multiplexers. Current threshold detectors monitor the current during every output of the power converter.

If an over current condition should arise, defined as a logic High at any of the overcurrent inputs at the sampling instant, a multiplexer will replace the digital error with a negative constant. The duty ratio is then decreased each switching cycle until the output current returns to the normal range. Once the output current has been reduced, the controller will then respond to the digital error signal and attempt to regulate the output voltage. This may cause an overcurrent condition to be regenerated (if the load impedance is too small) which will again result in the duty ratio being reduced since the controller is acting as a current-ripple regulator. The current limit constant may then be used to control the shape and the frequency of the current ripple.

When the power converter is powered-up a soft-start input will set a flip-flop which through the action of a multiplexer will reconfigure the PID controller to that of a very slow open-loop integrator. The proportional and differential branches are removed from the control loop and the integral weighting coefficient is multiplied by an additional constant $K_S$ which typically has a value of 1/512. This will cause the duty ratio and the output voltage to increment at a slow rate. When the output voltage of the power converter is less than the threshold voltage of the digital error amplifier, the digital error will be a constant $e_{MAX}$. Assuming that the duty ratio is a continuous variable, the change in duty ratio from one cycle to the next during soft-start is $$d_{n+1} - d_n = e_{max} K_I K_S$$

Since the duty ratio is a quantized variable the reciprocal of the right-hand-side of the above equation gives the number of switching cycles that are required to increment the duty ratio by one unit. Eventually the output voltage of the power converter will climb into the active region of the digital error amplifier. When the digital error changes from its maximum value, as detected by a digital comparator, the original PID control loop will be restored. Since the digital error corresponds to a direct measurement of the output voltage, another digital comparator may also be used to generate a power master-clear signal.

Undervoltage lockout and overvoltage shutdown capabilities may be added to the digital controller by using sense lines to monitor both the input voltage and output voltage(s) of the power converter. If the input voltage is too low or the output voltage is too high, all of the registers in the controller will be cleared—holding the duty ratio at zero. Once the erroneous condition has been removed, as detected by the appropriate sense line, the power converter will restart in the softstart mode.

The design goals of the described embodiment are to deliver a regulated 5 V d.c. output at currents up to 40 Amps from an unregulated d.c. source which may vary from 95 V to 205 V. The switching frequency of the power converter was set to 156.25 KHz by the selection of a 40 MHz crystal oscillator to drive the digital PID controller.

A single phase version of the digitally controlled power converter 10 of the present invention is described by reference to the overall block diagram of FIG. 1. A DC switching regulator 12 provides voltage pulses via the diode 23 across the load resistor 76. The signal that is developed across the load resistor 76 is supplied to the inverting input terminal of a differential amplifier 18. The noninverting input terminal 20 of the amplifier 18 is coupled to a voltage reference source.

therefore, there will be an output from the amplifier 18 that is proportional to the difference between the voltage across the load resistor 76 and the reference voltage 20. The output of the amplifier 18 is coupled to a sample-and-hold circuit 22 which stores the incoming pulses so that they may be converted by the analog-to-digital (A/D) converter 24 into digital signals representative of the amplitude of the input signals that are coupled to the amplifier 18.

The output of the A/D converter 24 provides digital error signals on the multiple line bus 25. The digital signals on the bus 25, which are directly proportional to the magnitude of the voltage that is developed across the load resistor 76, are supplied to a digital multiplying circuit 30. This branch is termed the proportional branch because the signals developed in this branch are proportional to the difference between the actual voltage across the resistor 76 and the reference voltage. The multiplying circuit 30 may be employed to multiply the signals on the bus 25 by a multiplication factor $K_P$ which serves as a weighing factor for the proportional error signal.

The digital signals from the A/D converter 24 are also supplied on a group of lines 32 to a discrete integrator 34. The value of the digital signals on the lines 32 represent the current input error signal, which is proportional to the difference between the desired reference voltage on the terminal 20 and the actual reference voltage that is developed across the load resistor 76. The discrete integrator adds the current error signal on the lines 32 to the sum of the previous error signals, which are stored in the discrete integrator 34, and provides an integrated error summation signal on the lines 36 to the multiplication circuit 38. The multiplication circuit 38 multiplies the summation signals on the lines 36 by an integration factor constant $K_I$.

The output signals from the A/D converter 24 are also provided on the lines 40 in a third branch of the system to a discrete differentiator 42. The discrete differentiator 42 stores the value of the error signal from the previous sampling cycle and subtracts it from the value of the current error signal, to provide a differentiated error signal on the lines 44 to the multiplication circuit 46. The multiplier 46 multiplies the digital signals on the lines 44 by a differential weighing factor $K_D$. The factors $K_P$, $K_I$ and $K_D$ may be varied independently to reduce the error voltage signal in the most effective manner.

The discrete differentiator branch is provided to minimize dynamic errors in the loop. The discrete integrator branch, on the other hand, reduces the static, or steady-state, errors. By providing both the integration and differentiating multiplication factors $K_I$ and $K_D$, the power converter is capable of achieving a satisfactory compromise between good static and good dynamic performance of the loop.

The output of the multiplication circuit 30 is provided on the line 48 to one input of a summation circuit 54. The outputs of the multiplication circuits 38 and 46 are similarly applied on the lines 50 and 52 to second and third inputs of the digital summation circuit 54. The digitized sum of these signals is coupled on the lines 56 to one set of inputs of a digital comparator 58. A stable oscillator circuit 60 is coupled to a counter 62 which supplies an output to a second set of inputs of the comparator 58. A second comparator 64 also has one of set of inputs coupled to receive the output count of the counter 62, and another set of inputs of the comparator 64 is coupled on the lines 66 to receive a digital representation of a 0 count.

The output of the comparator 58 is supplied on the line 68 to the reset, or R, terminal of the latch 72 (which may be a conventional flip-flop) while the output of the comparator 64 is supplied to the set 70, or S, input terminal of the latch 72. The output of the latch 72 is supplied on the line 74 back to the switching regulator 12 as a feedback control signal. Thus, in operation, the latch 72 will be set when the count in the counter 62 is 0, and it will remain set until the count in the counter 62 is equal to the value of the digital signals on the lines 56, which are supplied by the summation circuit 54. When these values are equal, the latch 72 is reset by an output from the comparator on the line 68, and the output of the latch on the line 74 changes states. By controlling the time that the latch 72 remains in a set state, the duty cycle of the switching regulator 12 is regulated as a function of the difference between the output amplitude of the switching regulator 12 and the desired referenced voltage. In the present invention this is achieved in a precise digital quantized manner which also incorporates the advantages of digital proportional, integral and derivative feedback control.

A more detailed representation of a power converter constructed in accordance with the present invention, is shown in FIGS. 3–12 in which 8 output phases are developed, instead of a single output phase, and the structure described above in conjunction with FIG. 1 is still applicable. FIGS. 3–5, 7–11 each consist of "a" and "b" subfigure designations. FIGS. 3a and 3b illustrate an 8-bit 4-phase clock generator that develops the basic timing-signals of this embodiment. The clock phases provided by the clock generator of FIG. 3 are again divided by frequency pairs of flip-flops (shown in FIGS. 4 and 5) wherein each flip-flop is associated with a particular clock phase so that each of the 4 clock phases of FIG. 3 provide 2 output phases for a total of 8 clock phases.

A stable oscillator 61 initiates the generation of the timing signal. The output of the oscillator 61 is coupled through the inverter 63 to a delay line 65. The delay line 65 has a first tap 67 which provides an output signal after a predetermined delay that allows the counters 69–71 time to stabilize after being clocked by the output of the amplifier 63. A second tap 73 is provided on the delay line so that the combination of the signals appearing on the taps 67 and 73 determine the width of the output pulse that is coupled through the Exclusive-OR gate 75.

The output of the Exclusive-OR gate 75 is coupled on the line 76 in the form of pulses which appear when only one of the taps 67 or 73 are at a HIGH level. As the input signal passes down the delay line 65, the tap 67 will first be at a HIGH level while the tap 73 is at a LOW level, which initiates the generation of a first pulse on the output line 76. As the signal progresses down the delay line, a point is reached where the signals on both of the taps 67 and 73 will be at a HIGH level and the output of the Exclusive-OR gate 75 then drops to a LOW level. Further progression of the signal down the line results in the tap 67 being at a LOW level and the tap 73 being at a HIGH level, which causes the generation of a second output pulse on the line 76 for each input pulse supplied by the amplifier 63. Thus, the output pulses on the line 76 will occur at twice the frequency of the pulses appearing at the output of the inverter 93.

The signals which appear on the tap 67 are also coupled through the inverter 78 to the line 80 at the same frequency as the output of the inverter 63. The signals on the line 76 are used as a clocking input for the latch 82 so that each time the clock input from the lines 76 changes from a LOW to a HIGH level the inputs labeled $D_0$–$D_7$ will be sampled, where $D_0$ representing the least significant bit and $D_7$ represents the most significant bit on the input lines 80 and 88–100.

The output of the inverter 63 is supplied on the lines 84 and 86 to the clock terminals of the counters 69 and 71. The counter output lines 88, 90, 92 and 94, which receive the clock signals $Q_0$ through $Q_3$, respectively, provide a train of clock pulses. The $Q_0$ signal occurs at one-half of the frequency of the pulses from the amplifier 63, and each of the lines $Q_1$ through $Q_3$ provide timing pulses at one-half of the repetition rate of the clock signal that appears on the line above it. In a similar manner, the output signals on the lines 96, 98, 100 and 102 of the counter 71 each occur at one-half of the rate of the timing signal rate that appears on the line immediately above it. Thus, for example, if the oscillator 61 operated at 20 MHz, the signal on the line 76 would be at 40 MHz while the signal on the line 80 would be at 20 MHz. Correspondingly, the signal on the line 88 would be at 78.125 KHz.

The output lines 88–102 of the counters 69 and 71 are coupled to the inputs $D_0$–$D_7$ of the latch 82. The output signals $Q_0$–$Q_7$ which occur on the output lines 142–156 provide 8 clocking signals, with the clock signal on the line 142 being at the slowest rate. For example, with a 20 MHz oscillation output the clock timing signals on the line 156 will occur at a clock rate, of 156.25 KHz. The 78.125 KHz signal on the line 102 is brought out on the line as the CLA 8 signal. The lines 154, 156 and 104 consist of a group of signals which are grouped and labeled as clock phase A signals, which form one phase of a 4-phase clock. The signals on the lines 142–152 cause of their relatively high frequency are not specifically assigned to a particular clock phase.

The output lines 98, 100, and 102 of the counter 71 are coupled to the $A_0$, $A_1$ and $A_2$ lines, respectively, of the Arithmetic and Logic Units (ALU) 112, 114 and 116. The $A_3$ input of these ALUs are all coupled to a LOW level, as indicated by the open triangles in the drawings. The $B_0$, $B_1$ and $B_2$ inputs are all coupled to a HIGH level, (as indicated by the open box in the drawings), while the $B_3$ input is coupled to a LOW level for ALU 112. The $B_0$ and $B_3$ inputs of ALU are coupled to a LOW level, while its $B_1$ and $B_2$ inputs are coupled to HIGH level. For the ALU 116 the $B_0$ and $B_2$ inputs are coupled to a HIGH level, while the $B_1$ and $B_3$ inputs are coupled to a LOW level. The carry inputs, $C_{IN}$, are all coupled to a LOW level. Consequently, the ALU 112 will add a digital 7 to the number represented by the signals on the $A_0$, $A_1$ and $A_2$ inputs. In a like manner, the ALU 114 will add 6 to the value of the inputs on the $A_0$ through $A_2$ terminals, and a count of 5 will be added by the ALU 116. The effect of the additions provided by the ALU unit 112 is to provide a train of output clock pulses on the lines 112, 124 and 126, which have the same duration and timing as the signals on the lines 154, 156 and 104, but which are displaced in time from these signals by 90° with respect to the signal provided by line 156.

The $S_0$ and $S_1$ output signals for ALU 112 on the lines 122 and 124 are supplied as $D_0$ and $D_1$ input signals to the sampling latch 118, which is clocked by the signal on the line 120 that is coupled to line 76. The $S_2$ signal from ALU 112 is supplied on the line 126 directly as the clock lowest frequency signal clock phase B, which is labeled CLB8. The $S_0$ and $S_1$ output signals from the ALU 114 are supplied on the lines 130 and 132 to the $D_2$ and $D_3$ inputs of the latch 18. The $S_2$ output from the ALU 114 on the line 134 is utilized as the lowest frequency clock phase C signal, which is labeled CLC8. The $S_0$ and $S_1$ outputs of the ALU 116 are supplied on the lines 136 and 138 to the $D_4$ $D_5$ inputs of the latch 118. The $S_3$ from the ALU 116 on the line 140 is utilized as the lowest frequency clock phase D signal, which is labeled CLD8. The clock circuitry of FIG. 3, therefore, provides 4 clock phases, each of which supplies multiple clock signals for one clock phase. The CLB6, CLB7 signals are supplied on the lines 158, 160, the CLC6, CLC7 signals are supplied on the lines 162, 164 and the CLD6, CLD7 signals are supplied on the lines 166, 168.

When the power converter is first turned on, it is desirable to immediately issue a CLEAR signal to the system. this ensures that the control circuitry does not begin to operate until a predetermined time has elapsed, which allows the voltage at critical places in the power converter time to stabilize and the control section to ignore transient conditions. This is achieved with the AND gate 170, one input of which is permanently coupled to a HIGH level, and the other input of which is coupled to the junction point of a resistor 174 and a capacitor 176. The capacitor is connected at its other end to ground at the terminal 177, while the resistor is coupled to a positive voltage supply at the terminal 178.

After the predetermined time delay which is determined by the RC constant of the circuit, the second input terminal of the AND gate will be, at a HIGH level, and the AND gate will then issue a HIGH signal on the line 180. Assuming for the present, that the lines 192 and 196 which are connected to the other inputs and AND gate 186 are at a HIGH level, the line 184 will assume a HIGH level also. The CLEAR signal of the described embodiment thus occurs when the power is turned and the line 184 will, therefore, initially be at a LOW level. Following the predetermined time delay, the initial LOW level CLEAR signal on the line 184 is released.

An undervoltage lockout comparator 190 has its output coupled on the line 192 to supply a LOW level whenever the input voltage to the power converter drops below a specified amount. When the input voltage on its input terminal 91 is below a threshold value, the LOW level output signal of the comparator 190 on the line 192 causes the AND gate 186 to supply a LOW level CLEAR signal on the line 184.

An overvoltage comparator 194 may also be employed, wherein the output voltage is monitored by conventional sensing circuit supplied to the input terminal 195, so that if the output voltage rises to a level where it is outside of the range of adjustability for any of the outputs that are provided by the power converter, a LOW signal will be supplied on the line 196 which will generate a CLEAR signal on the line 184 in the event of overvoltage.

Figure 4A:
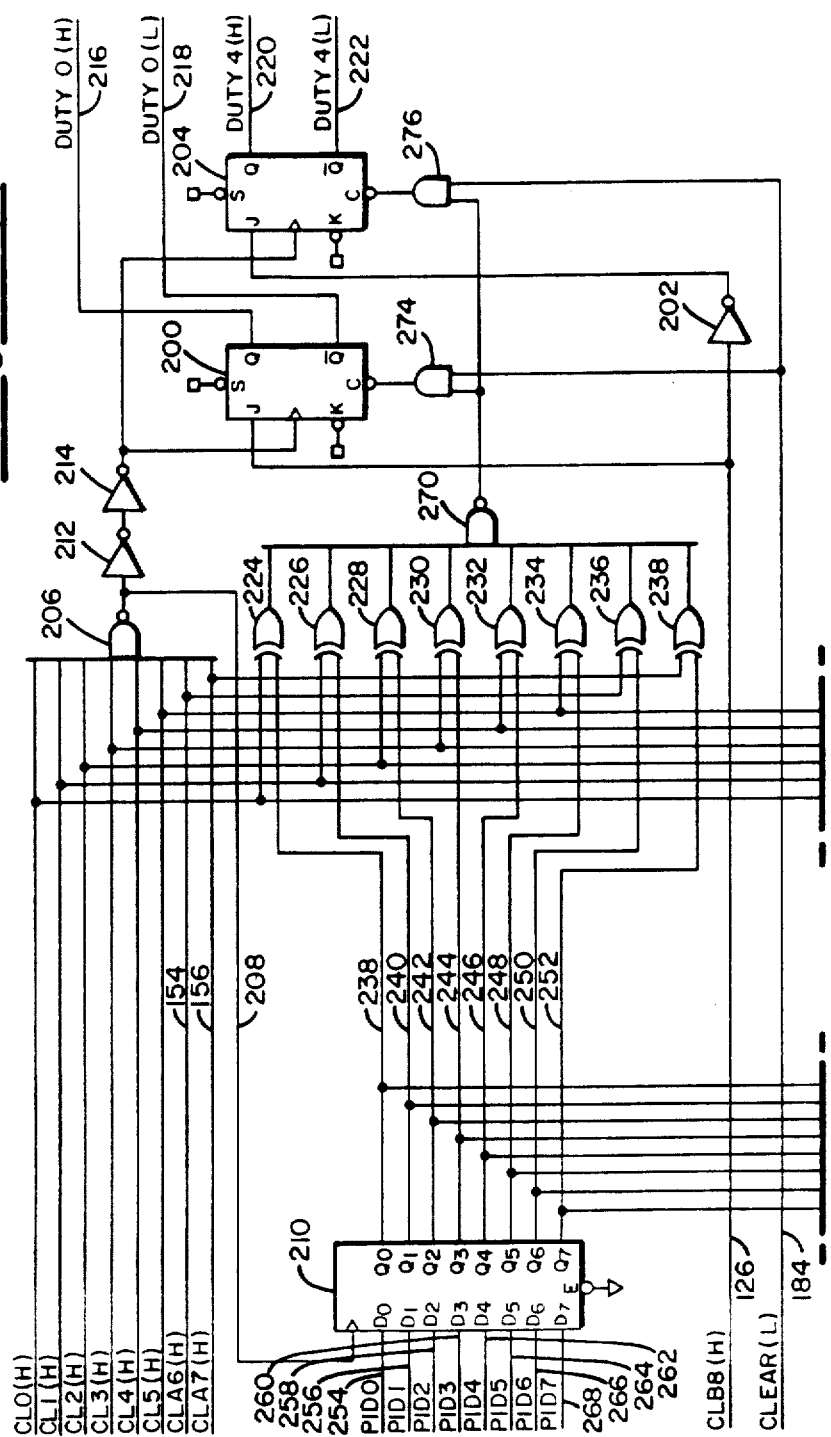
Figure 4B:
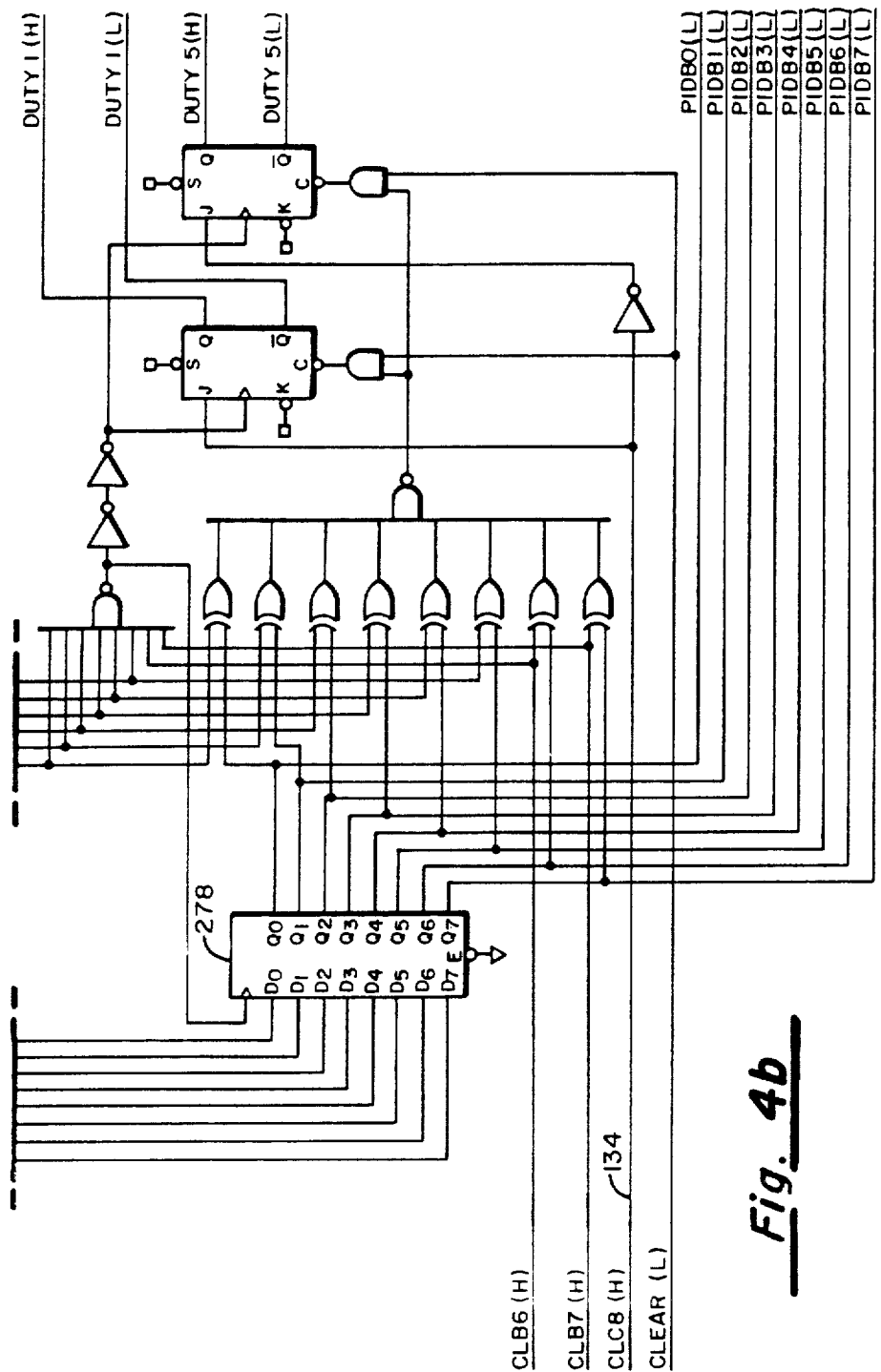
Figure 5A:
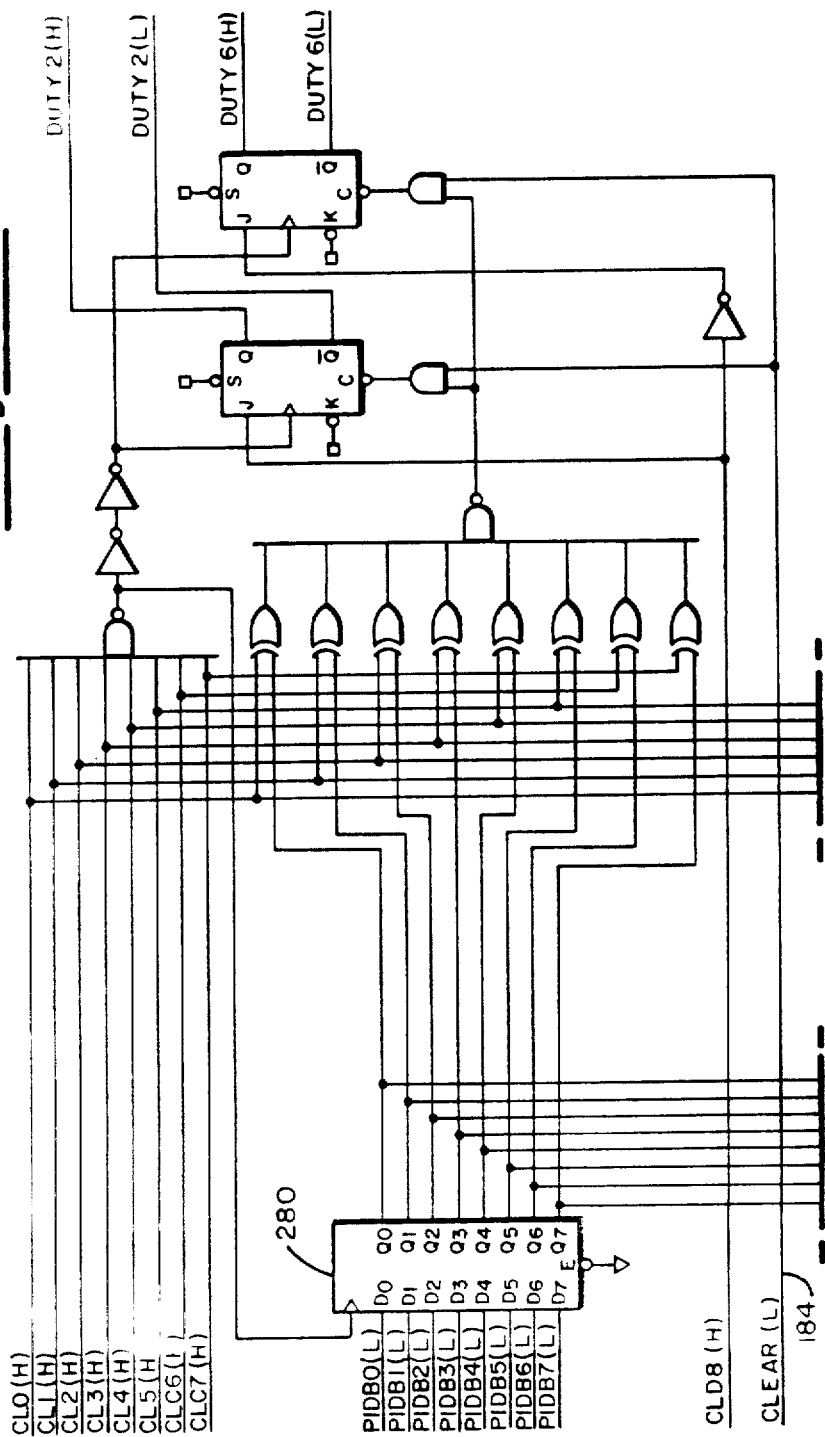
Figure 5B:
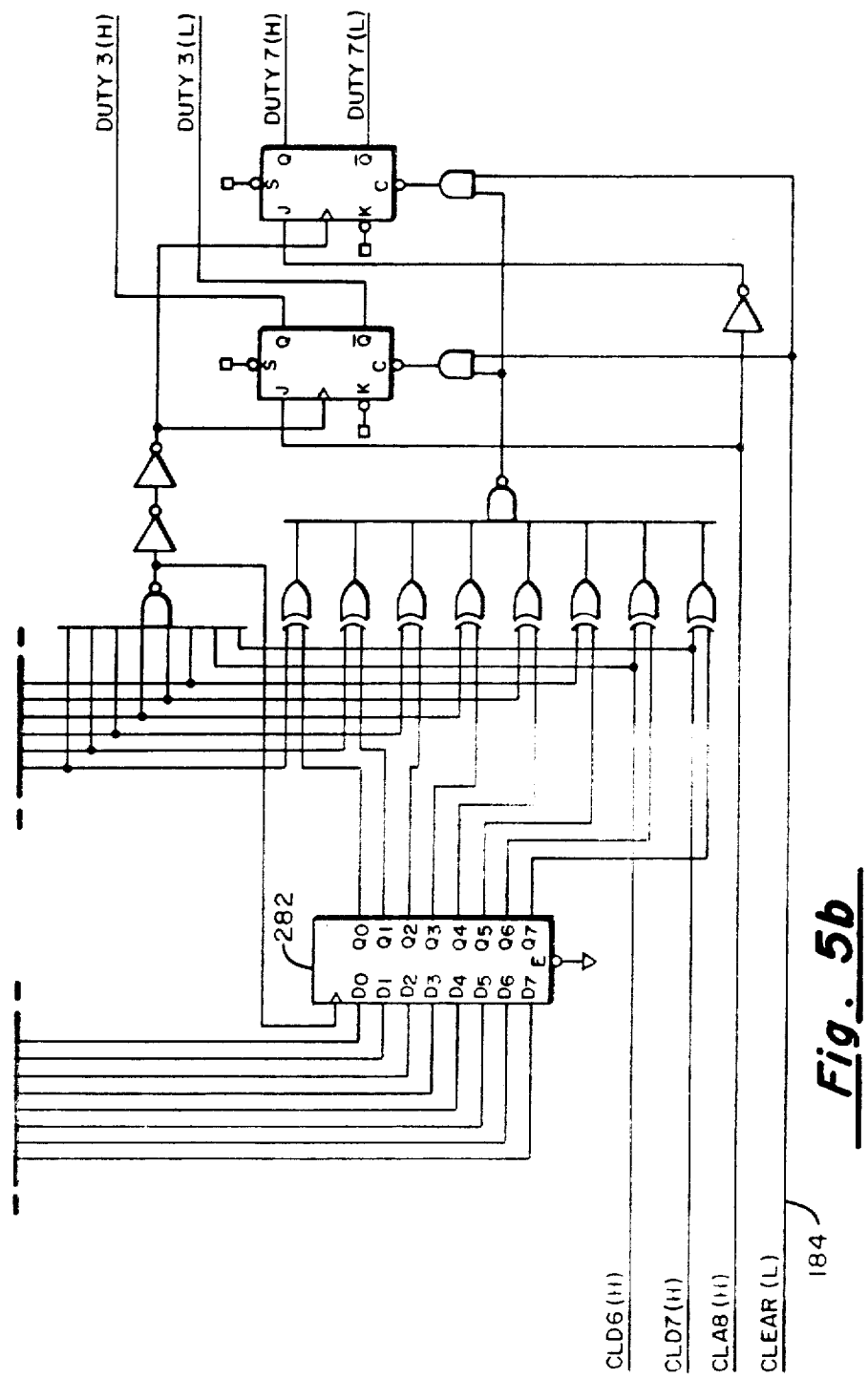

The circuitry of FIGS. 4a and 4b controls the duty cycle of the power converter for output phases 0,1, 4 and 5, while the circuitry of FIGS. 5a and 5b control output phases 2, 3, 6 and 7 of the power converter. Clock phase CLB8 on line 126 is coupled to the J input terminal of the flip-flop 200 directly, and through an inverter 202 to the J input of the flip-flop 204. The output of the J-K flip-flop 200 is utilized to control the duty cycle of the 0 clock output phase while the output of the flip-flop 204 is used to control the duty cycle of the output phase 4. Clock phase CLC8 on line 134 is associated with the duty cycles of phases 1 and 5. Clock phase CLD8 on the line 140 of FIG. 5 is associated with clock phases 2 and 6, and clock CLA8 on the line 104 is associated with clock phases 3 and 7. Since the configuration and operation of the circuitry for each of the output phases is identical, only the portion of the circuitry shown in FIG. 4 which is concerned with duty cycles 0 and 4, is specifically described herein.

The highest frequency clock signal bits are the "least 60 significant" timing signals on the lines 142-152 which are common to all 4-clock phases (i.e., they are the signals with the highest repetition rate). Those signals are supplied on the lines 142-152 to the inputs of a multiple input NAND gate 206, the output of which is coupled as a clocking signal on the line 208 to the latch 210. The CLA6 and CLA7 signals on the lines 154 and 156 are also supplied as input signals to the NAND gate 206. The output of the NAND gate 206 will be at a high logic level when a count of 255 is reached which indicates the end of a cycle, or that a complete output pulse has been supplied by each of the eight switching regulators that are controlled by the flip-flops of FIGS. 4 and 5.

In addition to being supplied as a clocking on line 208, the output of the NAND gate 200 is inverted twice by the amplifiers 212 and 214, and is supplied as a clock to the flip-flops 200, 204. At the end of each cycle, when the count reaches 255, the flip-flops 200 and 204 are triggered so as to provide alternating HIGH levels on the Q output terminals 216, and 220, since the K inputs of these flip-flops are permanently coupled to a HIGH level. The output levels on the Q and $\overline{Q}$ terminals 216, 218 of flip-flop 200 and the Q and $\overline{Q}$ terminals 220, 222 of the flip-flop 204 alternate so that when the output on the Q terminal of one of the flip-flops 200, 204 switches from a LOW to a HIGH level, the output on the other Q terminal will switch from a HIGH to a LOW level. The duration of time that the flip-flops 200, 204 remain at a HIGH level is controlled in a manner which is subsequently described.

All of the inputs which are connected to the NAND gate 206 are also connected to an input of one of the Exclusive-OR gates 224-238. The other input of each of these Exclusive-OR gates is provided by one of the outputs $Q_0$-$Q_7$ on the lines 238-252 from the latch 210. The input lines 254-268 to the sampling latch 210 are digital signal bits $PID_0$-$PID_7$, which are representative of the pulse duty cycle that has been selected to control the power converter, either by manually operated switches, or by automatic control elements. The Exclusive-OR gates 224-236 in combination with the NAND gate 270, to which all of the outputs of these Exclusive-OR gates are also connected, serve as a digital comparator. When the signals $CL_0$-$CL_5$, $CLA_6$, and $CLA_7$ on the lines 142-156 are matched with the signals on the lines 238-252, the outputs of all of the Exclusive-OR gates 224-236 will go to a HIGH level, which results in a LOW level output from the NAND gate 270 that is applied to the line 272.

The line 272 supplies its output signal to the AND gates 274 and 276 which are respectively coupled to the active LOW clear terminals of the flip-flops 200, 204. The other input of each of the AND gates 274 and 276 is supplied by the clear line 184. The flip-flops 200 and 204 are cleared either upon the occurrence of a LOW level clear signal on the line 184 or an output form the NAND gate 270 which indicates that there is equality between the digital signals that represent a desired pulse duty cycle and the actual pulse duty cycle. The flip-flops 200, 204 provide the desired duty cycle for output phases 0 and 4. In a similar manner, there is a cascaded latch 278 which has its input coupled to the lines 238-252 to receive the output bits $Q_0$-$Q_7$ as input signals which are representative of the desired pulse duty cycle. The remaining circuitry of FIG. 4 is identical to that previously described above and is used to provide control of the duty cycle for phases 1 and 5. In FIG. 5 there is a further cascaded latch 280 for controlling duty cycles 2 and 6, and another cascaded latch 282 which controls duty cycles 3 and 7.

Referring again to the NAND gate 270 of FIG. 4a, it is noted that the output of the NAND gate 270 will be at a logic LOW level whenever all of the Exclusive-OR gates 224-236 have a HIGH level output. Since the clear signal on the line 184 applied to the AND gates 274 and 276 is at a constant HIGH level after the initial power-on clear signal has issued, a comparison between the timing signals on the lines 142-156 and the outputs of the latch 210 results in the output of the NAND gate 270 going to a LOW level, which allows the flip-flops 200, 204, to be cleared. This occurs when the total proportional-integral-differential signal at the output of latch 210 (active LOW) is equal to the appropriate timing HIGH level signals applied to the lines 142-156. Upon the reaching of a count of 255 at the end of a power converter cycle, the NAND gate 206 supplies a clocking pulse through the inverters 212 and 214 to the flip-flops 200 and 204, which causes them to change states in preparation for the next cycle period and utilization of the alternate output phase.

Figure 6:
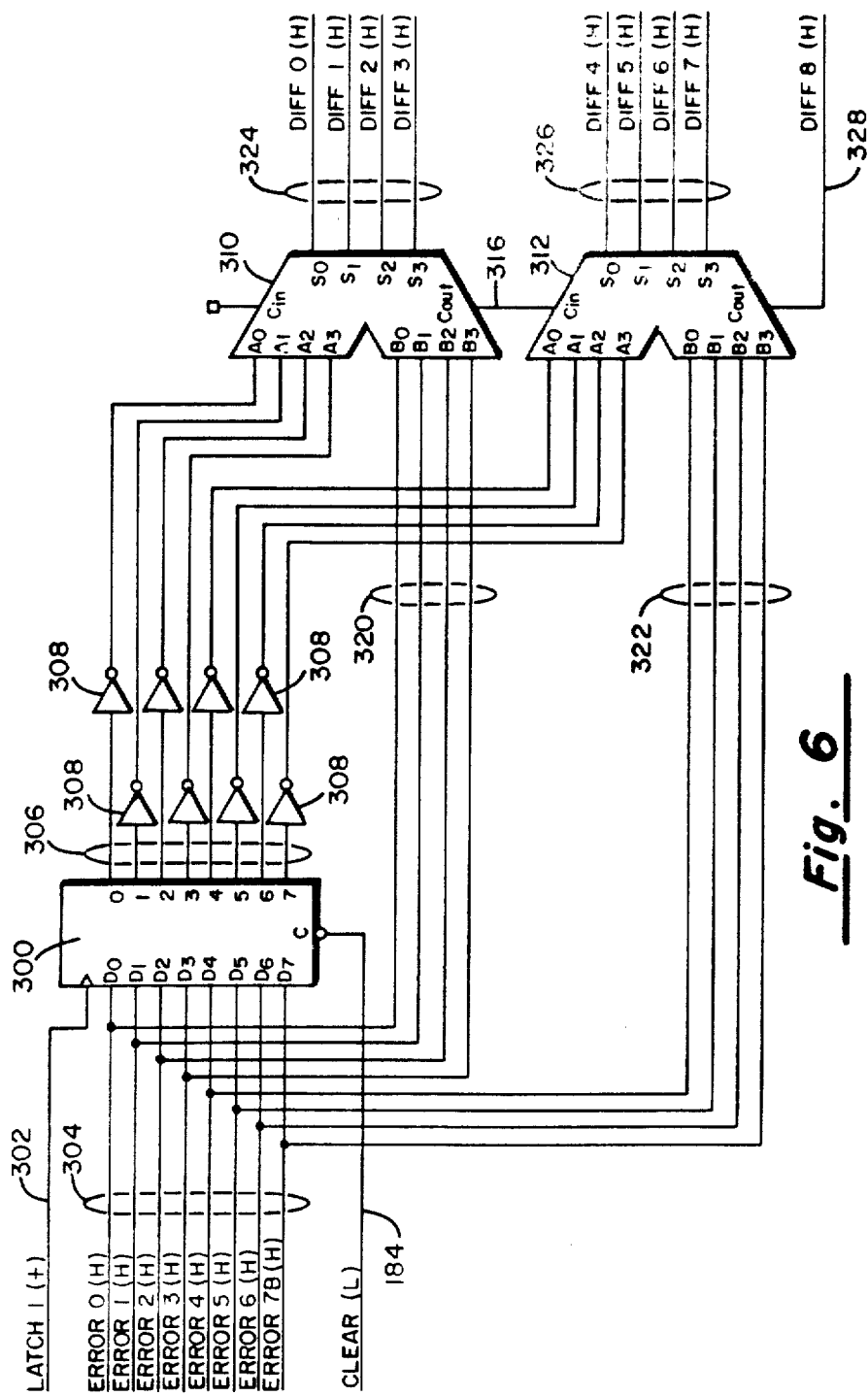

A discrete differentiator of the system is shown in FIG. 6 in which the digital error signal from the preceding cycle is subtracted from the digital error signal, which is called the differential error signal. The differentiator of FIG. 6 includes a sampling latch 300, the clocking signal for which is labeled "Latch 1" is supplied on the line 302. This signal is derived from circuitry shown in FIG. 11 and is timed to insure the differential error output is developed at the proper time. The digital signals on the lines 304, which are derived from the A/D converter 24 of FIG. 1a are an 8-bit representation of a twos complement error signal. The clear signal on the line 184 is also supplied to the latch 300.

The input error signal bits on the lines 304 form the previous cycle are stored in the Latch 300. The output bits of the Latch 300 supplied on output lines 306 are inverted by the inverters 308 and sent to the $A_0$-$A_3$ inputs of ALUs 310 and 312. The carry input, $C_{IN}$, of the ALU 310 is coupled to a HIGH level at the terminal 314 and the carry output, $C_{OUT}$, of the ALU 310 is coupled to the carry input, $C_{IN}$, of the ALU 312 on the line 316. The two ALUs 310 and 312 act as a subtractor that receives 8 bits on the $A_0$-$A_3$ input terminals which represent the switching duty ratio error signal for the previous sampling period. The $ERROR_0$-$ERROR_7$ signals on the lines 304 are also supplied on the lines 320 and 322 to the $B_0$-$B_3$ input terminals of the subtractor that consists of the ALUs 310 and 312. The output of the subtractor is a 9-bit signal, which represents a discrete differential error value. The four least significant bits are coupled on the lines 324, and the four most significant bits being supplied on output lines 326, as bits $DIFF_0$–$DIFF_7$. If a borrow occurs in the subtraction process, the line 328 provides a $DIFF_8$ HIGH output signal bit.

Figure 7A:
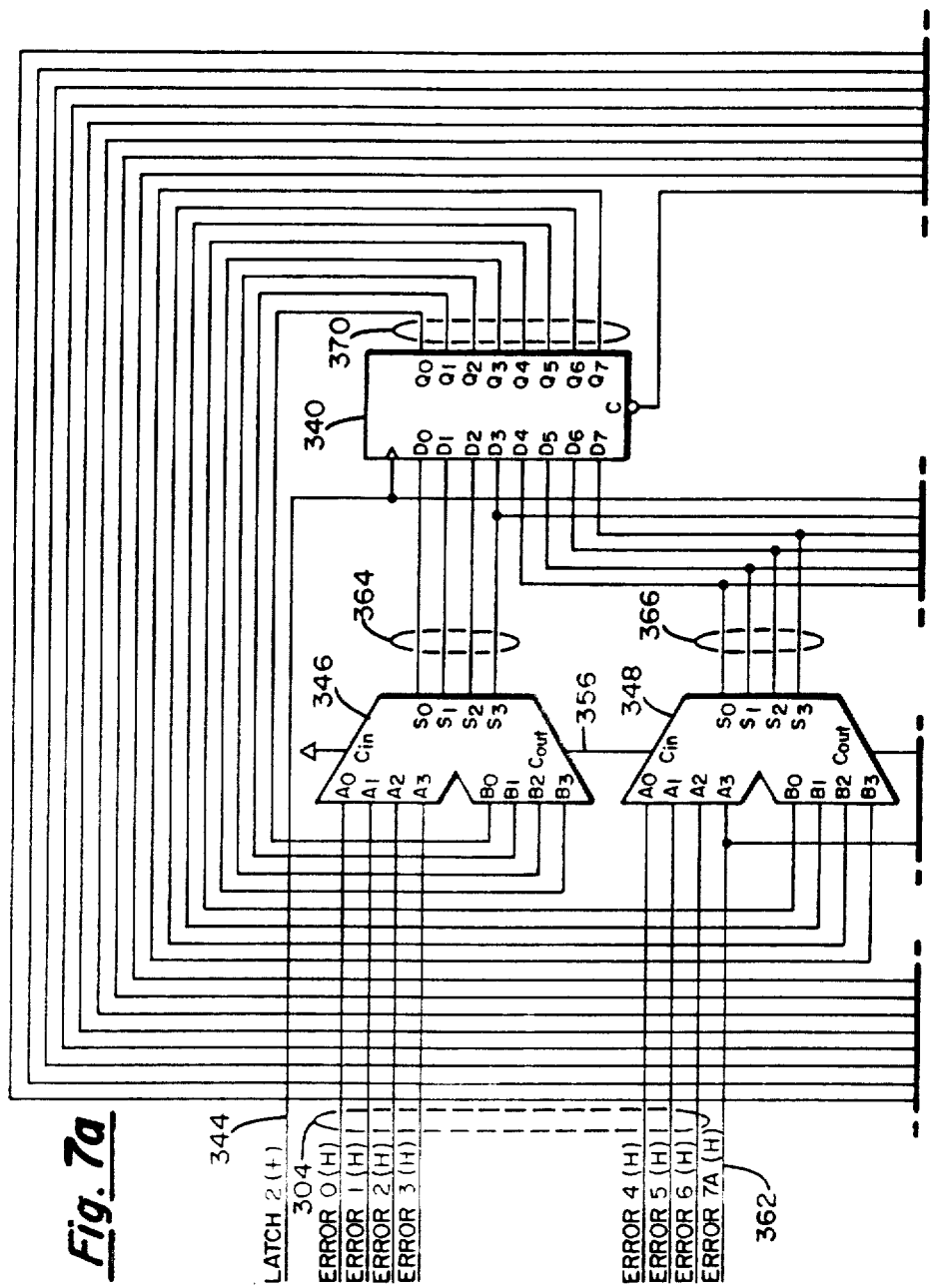
Figure 7B:
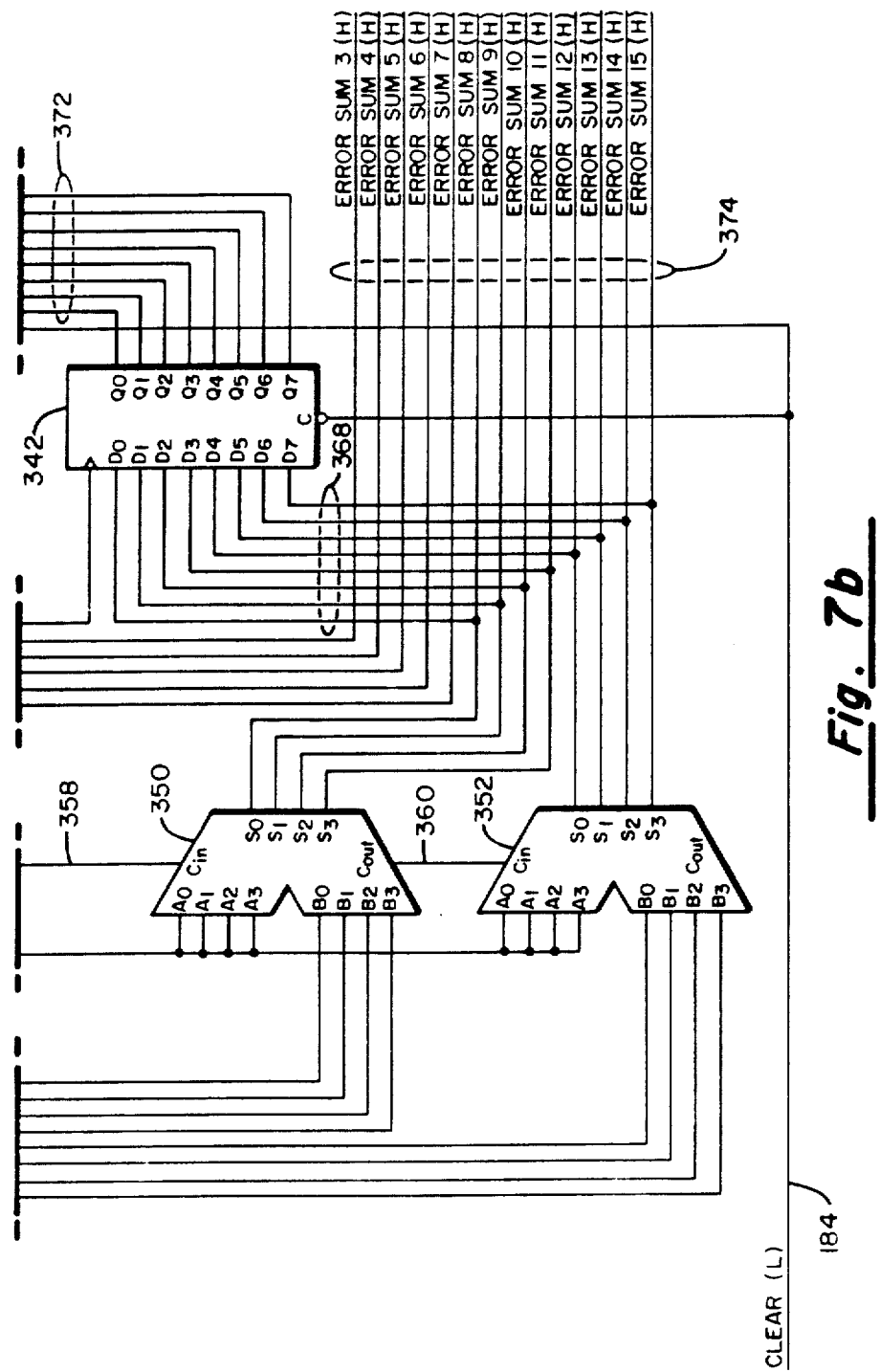

A discrete integrator that is employed in the described embodiment is illustrated in FIGS. 7a and 7b which utilizes latches 340 and 342. The latches are clocked by the "Latch 2" timing signal on the line 344, which is developed in circuitry shown in FIG. 9 in a manner that will subsequently be described in more detail. The digital error signal bits $ERROR_0$–$ERROR_7$ on the lines 304 are also supplied to the inputs of the ALUs 346, 348, and 350 and 352. The carry input of the ALU 346 is connected to a LOW logic level. The carry outputs of the ALUs 346, 348 and 350 are coupled to the carry input of the next lower ALU in the figure on the lines 356, 358 and 360, respectively. The ALUs 346–352, therefore, consist of a 16-bit adder. The most significant error bit $ERROR_7$ on the line 362, is coupled to the most significant bit of the $A_3$ input of the ALU 343 and to all of the $A_0$–$A_3$ inputs of ALU 350 and 352. The signal on the line 362 represents the sign of the error signal in twos complement notation. The reason for connecting the line 362 to the inputs $A_0$–$A_3$ of the ALUs 350 and 352 is to extend the sign bit so that the error signal of the current sampling period of 8 bits may be added with the error signal of the current sampling period of 8 bits may be added with the error signal of the prior sampling period to provide a 16-bit output signal from the discrete integrator.

The lowest ordered 8 bits of the ErrorSum signal are coupled to the $D_0$–$D_7$ inputs of the latch 340 on the lines 364 and 366 from $S_0$–$S_3$ outputs of the ALUs 346 and 366. The highest ordered 8 bits are coupled on the input lines 368 from the $S_0S_3$ outputs of the ALUs 350 and 352 to the $D_0$–$D_7$ inputs of the latch 342. The output of the latch 340 feedback on the lines 370 to the $B_0B_4$ input terminals of the ALUs 340 and 346, while the output of the latch 342 is coupled on the lines 372 back to the $B_0B_4$ input terminals of the ALUs 350 and 352. In this manner, an 8-bit error signal from the current sampling period is added to a 16-bit error sum signal, and the output of the 13 bits most significant bits of the result is supplied on the output lines 374 from the ALUs 346–352 are ERROR $SUM_3$–ERROR $SUM_{15}$ bits. Only the error bits 3 through 15 are employed in the illustrated implementation since this allows for the required error resolution of the described embodiment, although any number of error bits may be employed in accordance with the resolution of the integrated error that is desired.

Figure 8A:
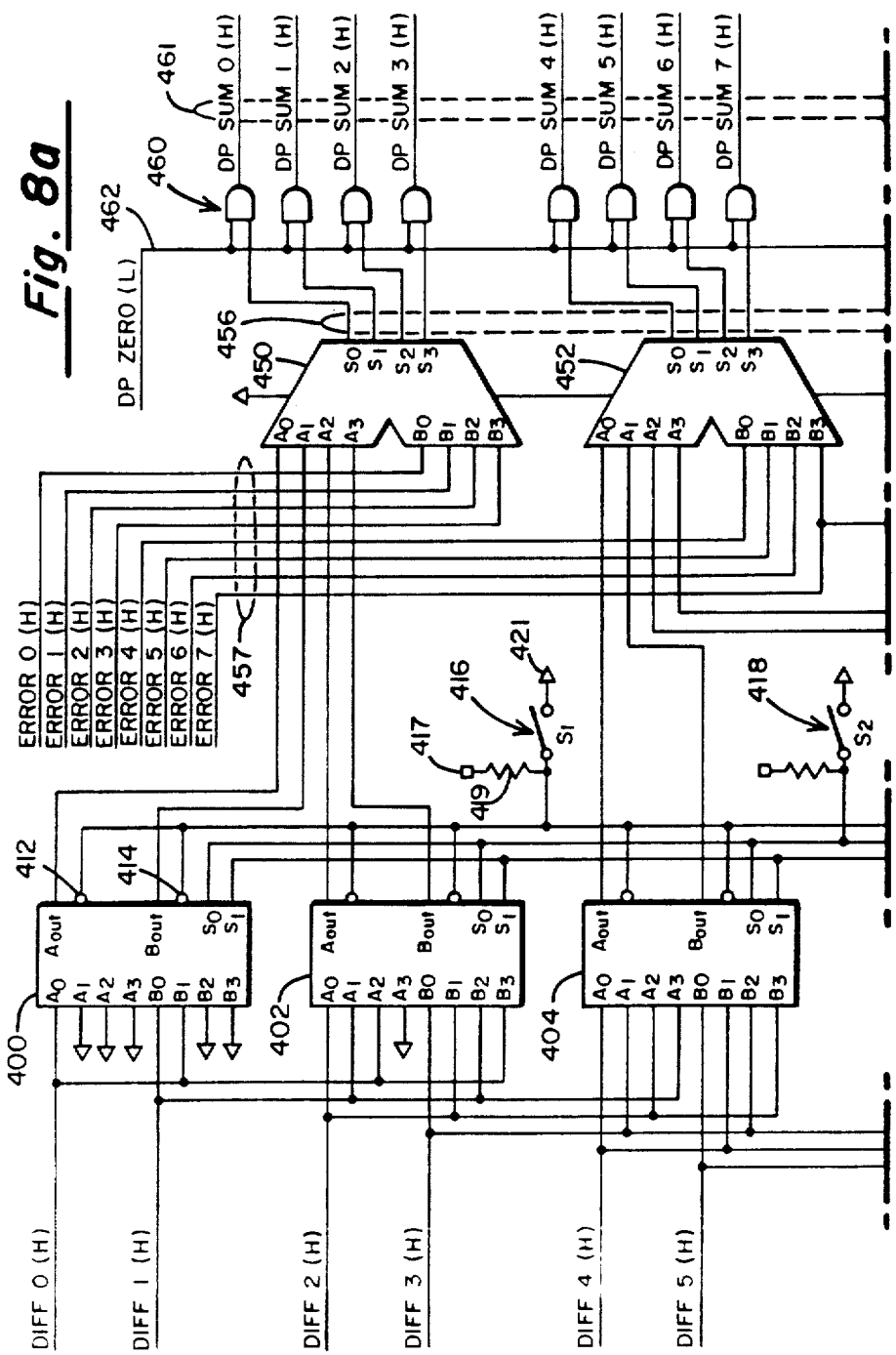
Figure 8B:
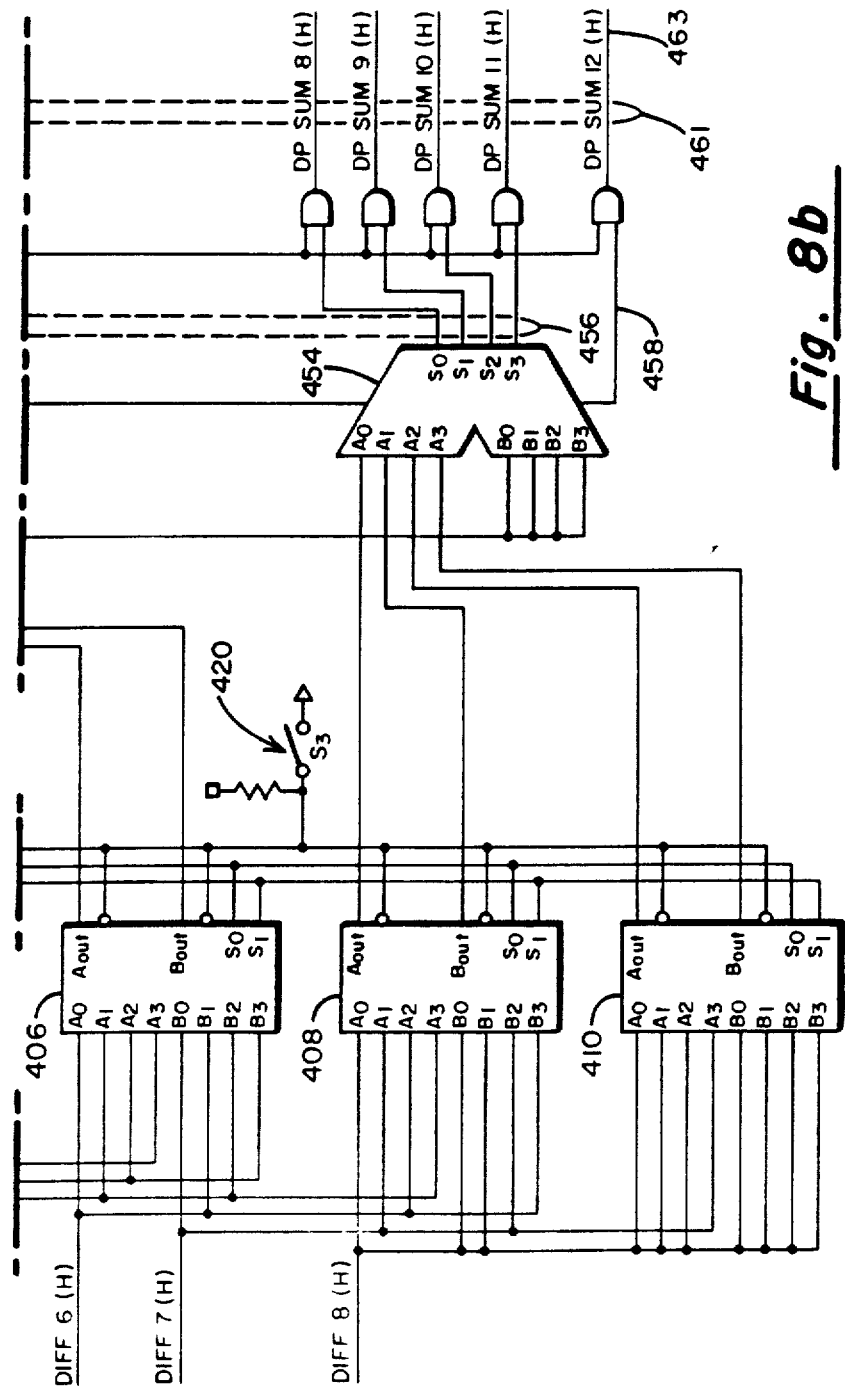

FIGS. 8a and 8b illustrate how $K_D$ differentiation multiplication factor that is used as a weighing factor for the differential error signal is developed. In order to avoid extensive multiplication hardware, the described implementation employs six dual one-of-four decoders 400–410. The 9-bit differentiator error signal on the output lines 324 and 326 and the carry line 328 of FIG. 6 are applied in a preselected pattern to the inputs of the decoders 400–410. The terminals labeled $A_0$–$A_3$ represent one group of four input terminals, one of which may be selected at a given time, while the terminals $B_0$–$B_3$ represent a separate group of four input terminals, again one of which may also be independently selected at a given time. Each of the decoders 400–410 have an A enable terminal, such as the terminal 412 of the decoder 400, and a B enable terminal, such as the terminal 414, both of which are active LOW inputs.

The A enable and B enable terminals are all connected to the switch 416, which is also labeled $S_1$. When the switch 416 is open a HIGH logic level is coupled from the power terminal 417 through the resistor 419 to the A enable and B enable terminals and the decoders 400–410 are disabled. Enablement is provided by closing the switch and coupling the ground level (a LOW logic level) from the terminals 421 through the switch to the A enable terminals. As noted in Table 1 when the switch 416 or $S_1$ is open, there will be no output-from the decoders 400–410, which in effect is multiplication by 0. Assuming, therefore, that switch 416 is closed, the state of the switch 418, which is also labeled as $S_2$ and the switch 420 which is also labeled as $S_3$, determine the multiplication factor that is applied to the input differentiator error signal from the discrete differentiator of FIG. 6.

Table 1 shows the multiplication factor when the switches 418 and 420 are opened of closed in various combinations. For example, when both switches 418, 420 (switches $S_2$ and $S_3$) are closed, there is a multiplication factor of 1. When switch 418 is closed and switch 420 is open the multiplication factor is 2. When switch 418 is open and switch 420 is closed the multiplication factor is 4 and when both switches 418 and 420 are open, the multiplication factor is 8.

Multiplication is achieved by the decoders 400–410 by particular combinations of input lines which are to be transferred to the output to accomplish the equivalent of a left-shift operation on the input signal without actually shifting any of the input data. Table 2 shows the manner in which this is achieved. The multiplication factors are illustrated in the far right-hand column. The corresponding A and B input data bits are listed for each of the one-of-four decoders 400–410. The inputs $A_1$–$A_3$ and $B_2$–$B_3$ of decoder 400 are connected permanently to a LOW logic level, as is the input $A_3$ of the decoder 402. The switch 418 is coupled to the $S_0$ enable line of all of the units while the switch 420 is coupled to the $S_1$ enable line. The correlation of selected output bits $D_0$–$D_8$ with decoder inputs to the decoders 400–410 illustrated in Table 2, therefore, represents the various output permutations that are possible with the switches 418 and 420 to provide an equivalent left-shift multiplication corresponding to a selected multiplication factor $K_D$, when $D_8$ is the most significant output bit.

The differentiator error input signals, after being multiplied by the selected multiplication factor, are supplied to the $A_0$–$A_3$ inputs of a summer circuit formed of the ALUs 450, 452 and 454. The 8 error bits $ERROR_0$–$ERROR_7$ that are produced by the A/D converter 24 by the circuitry of FIG. 1 are supplied to the $B_0$–$B_3$ input terminals on the lines 457. The $ERROR_7$ signal is coupled to the most significant bit of the ALU 452 and to all of the $B_0$–$B_3$ inputs of the ALU 454, to extend the sign bit to these units. The outputs of the ALUs 450–454 are supplied on twelve output lines 456. These consist of the $S_0$–$S_3$ outputs, and there is one carry line 458 from ALU 454 to the AND gates 460. The outputs of the AND gates 460 are gated by the DP zero signal on a common line 462, which is normally at a HIGH level except during the soft-start operation, as will be subsequently described. Assuming that the line 462 is at a HIGH level, the outputs of the AND gates 460 provide a digital twelve bit signal that consists of the bits DP $SUM_0$–DP $SUM_{12}$, which represent a summation of the proportional error signal and the differentiated error signal.

Figure 9A:
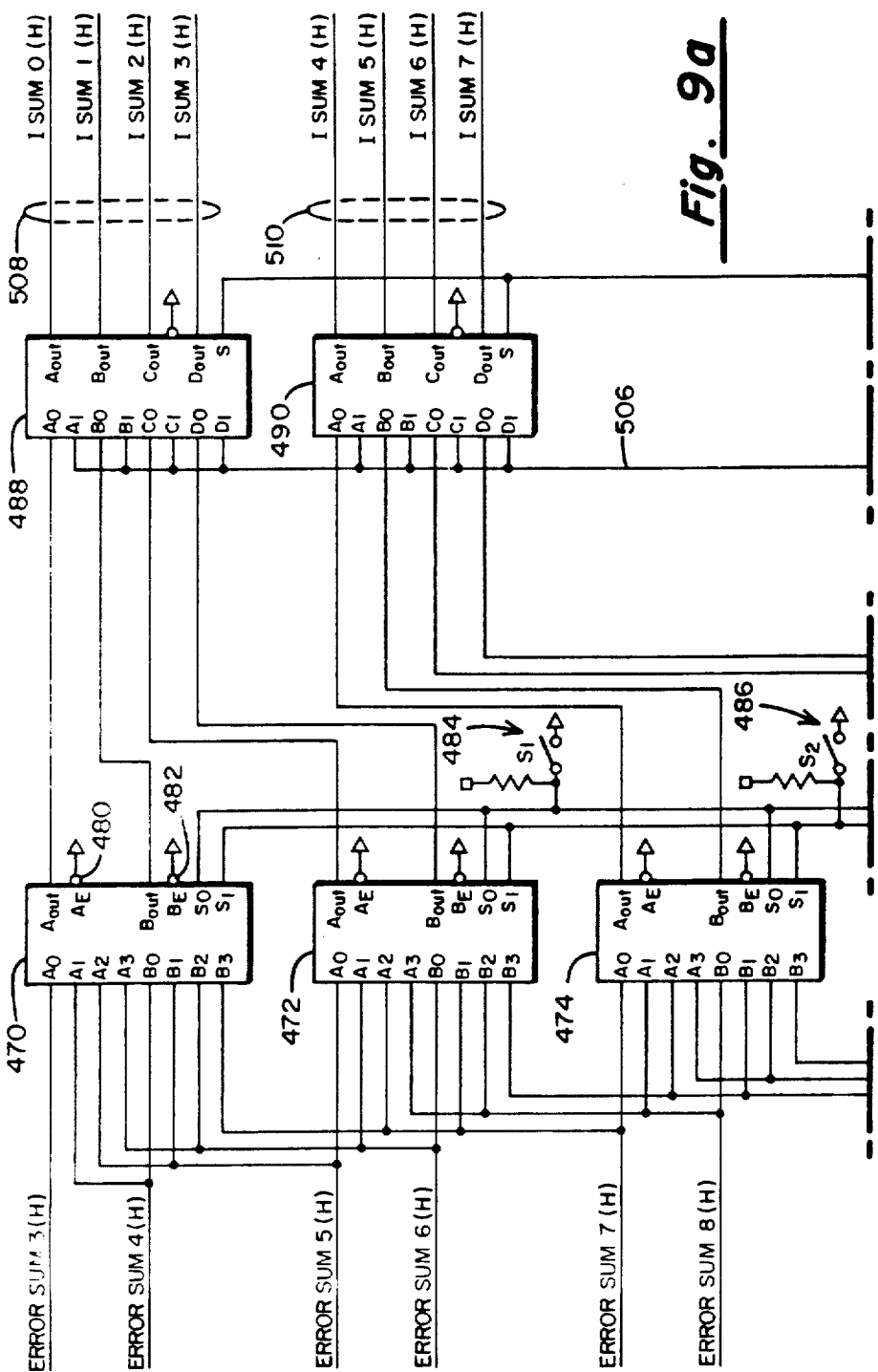
Figure 9B:
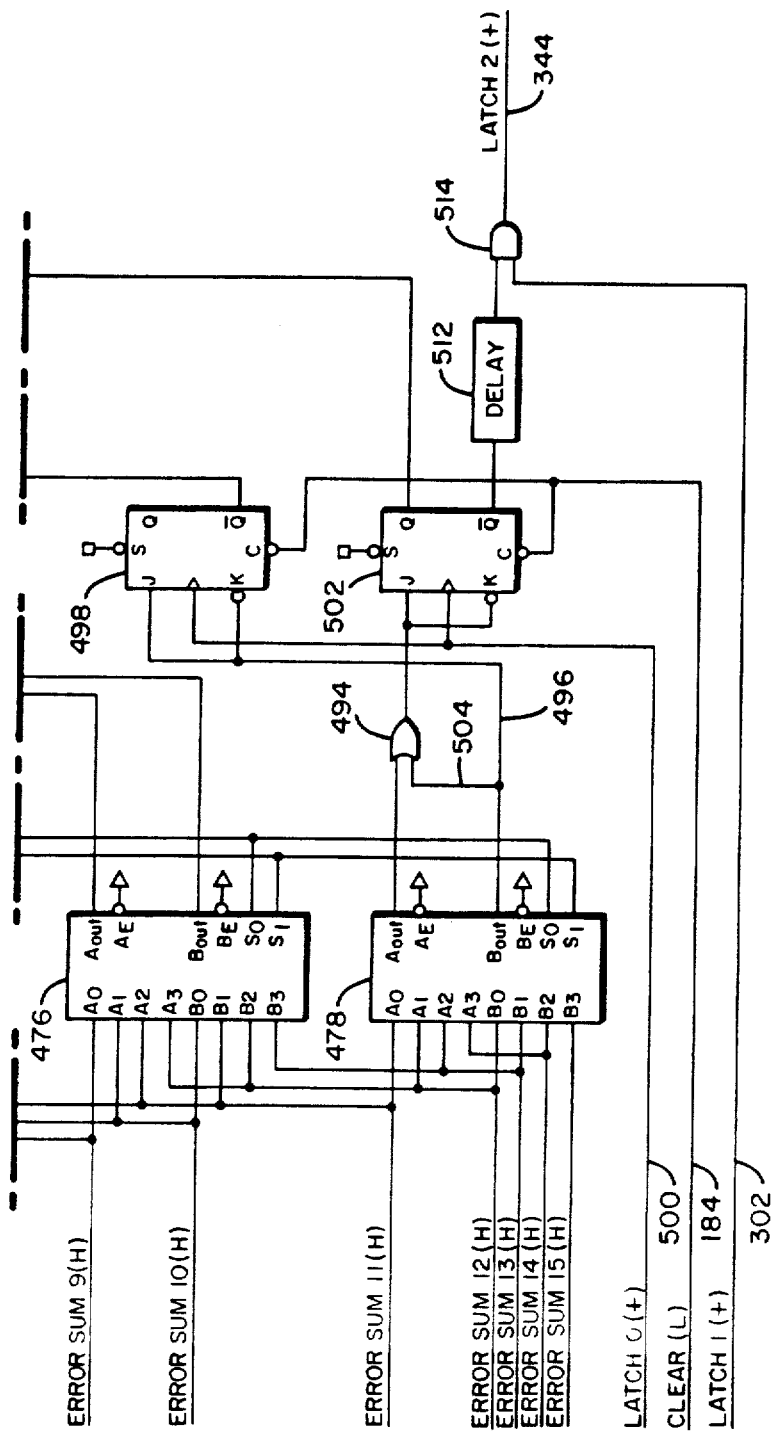

FIGS. 9a and 9b represent another section of the system in which the thirteen bits ERROR SUM$_3$-ERROR SUM$_{15}$ of the error sum signal from the integrator are divided by a predetermined integral number to provide the integral multiplication factor K$_I$. In FIG. 9 there are five dual one-of-four decoders 470–478. The A enable terminals, such as the A terminal 480, and the B enable terminals, such as the terminal 482, are tied permanently to a LOW level so they are permanently enable. Two selection switches 484 and 486, (also labeled S$_1$ and S$_2$), are utilized to select the desired one-of-four code in accordance with the levels applied to the selection control inputs S$_0$ and S$_1$. Table 3 shows various combinations of integral division factors which may be obtained with the two switches 484 and 486 which is equivalent to a right-shift, or divide function. Table 4 provides the correlation of selected output bits E$_-$–E$_{15}$ with the decoder inputs to the decoders 470–478, where E$_{15}$ is the most significant output bit.

After the desired division function is obtained, the outputs of the one-of-four decoders 470–478 are coupled as inputs to the quad one-of-two decoders 488 and 490. The enable terminals, such as the enable terminal 492 of the decoders 488 and 490 are permanently connected to LOW level so they are permanently enabled. The eight least significant bits that are provided by the decoders 470–478 are supplied to the one-of-four decoders 488, 490. The 9th and 10th significant bits, ISUM$_8$ and ISUM$_9$, from the decoder 478 are coupled to an OR gate 494. The 9th summation bit, ISUM$_8$, on the line 496 is also coupled to the inputs of a JK flip-flop 498. The "Latch 0" signal, which is derived from the portion of the system shown in FIG. 10, is supplied as a clocking signal on the line 500 to the flip-flop 498, and also to a second flip-flop 502. The output of the OR gate 494 is coupled to the J input terminal of the flip-flop 502. Both of the flip-flops 498 and 502 are cleared by a clear signal on the common clear line 184 when the signal on this line is at a LOW level.

Assuming that the signal on the clear line 184 is at a HIGH level after the power has been up for a sufficient time, the occurrence of a HIGH level ISUM$_8$ signal on the line 504 causes a HIGH input to the J terminal and an inverted input to the K terminal of the flip-flop 502. Since the K input of the flip-flop 502 is active at a LOW level, as indicated by the circle at the K terminal, the Q output of the flip-flop 502 goes to a HIGH level, which results in the selection of the input terminals that are connected to the Q output of the flip-flop 498 on the line 506, rather than lines that supply the error summation signals from the decoders 470–478. If the signal on the line 496 is at a LOW level at this time, the flip-flop 498 will be reset and a HIGH level will be applied on the line 506 to all of the inputs that are connected to this line on the decoders 488 and 490. The condition in which the signal on the line 504 is at a HIGH level, and the signal on line 496 is at a LOW level indicates that a positive overflow has occurred since the sign bit, or the most significant bit on the line 496, will be LOW when positive overflow occurs, and all inputs of the decoders 488, 490 will then be supplied a HIGH level.

If a negative number overflow, or underflow, occurs, the ISUM$_9$ bit signal on the line 496 goes to a HIGH level as well as the ISUM$_8$ bit signal on the line 504. When this happens, the flip-flop 498 is switched so that its Q output goes to a LOW level since the ISUM$_9$ bit on line 496 is applied to both the J input terminal and the active LOW K input terminal of the flip-flop 498. A HIGH level is, thereby, applied on the line 506 to the inputs of the decoders 488 and 490. A LOW level is thus provided at all of the inputs of the decoders 488 and 490 when a underflow occurs.

While the error summations input signals ERROR SUM$_3$–ERROR SUM$_{12}$ to the dual one-of-four decoders 470 and 478 are in twos complement format, the output summation signals on the lines 508 and 510 from the decoders 488 and 490 are 8-bit binary numbers which are no longer in twos complement format. As long as there is no overflow or underflow condition, the ISUM digits on the lines 508 and 510 represent the error sum bits 3 through 15 divided by the selected divisional factor. When an overflow occurs, however, all of the line 508 through 510 are at a HIGH level which is equivalent to a count of 225. Correspondingly when an underflow has occurred, all of the lines 508, 510 are at LOW level which is representative of a count of 0.

The Q output of the flip-flop 502 is also coupled to a delay circuit 512, the output of which is connected to one input of an AND gate 514. The other input of the AND gate 514 receives the Latch 1 signal on the line 302 that is produced in the soft-start position of the system, which is illustrated in FIG. 11. The AND gate 514 provides a HIGH Latch 2 output on the line 344 when these two inputs are HIGH. The Latch 2 signal on the line 344 is used to inhibit the discrete integrator of FIG. 7 whenever there is an overflow or an underflow error condition in order to prevent the integrator from accumulating further counts. The Latch 2 signal acts as a clocking signal for the latches 340 and 342 of the integrator, as previously described.

Figure 10B:
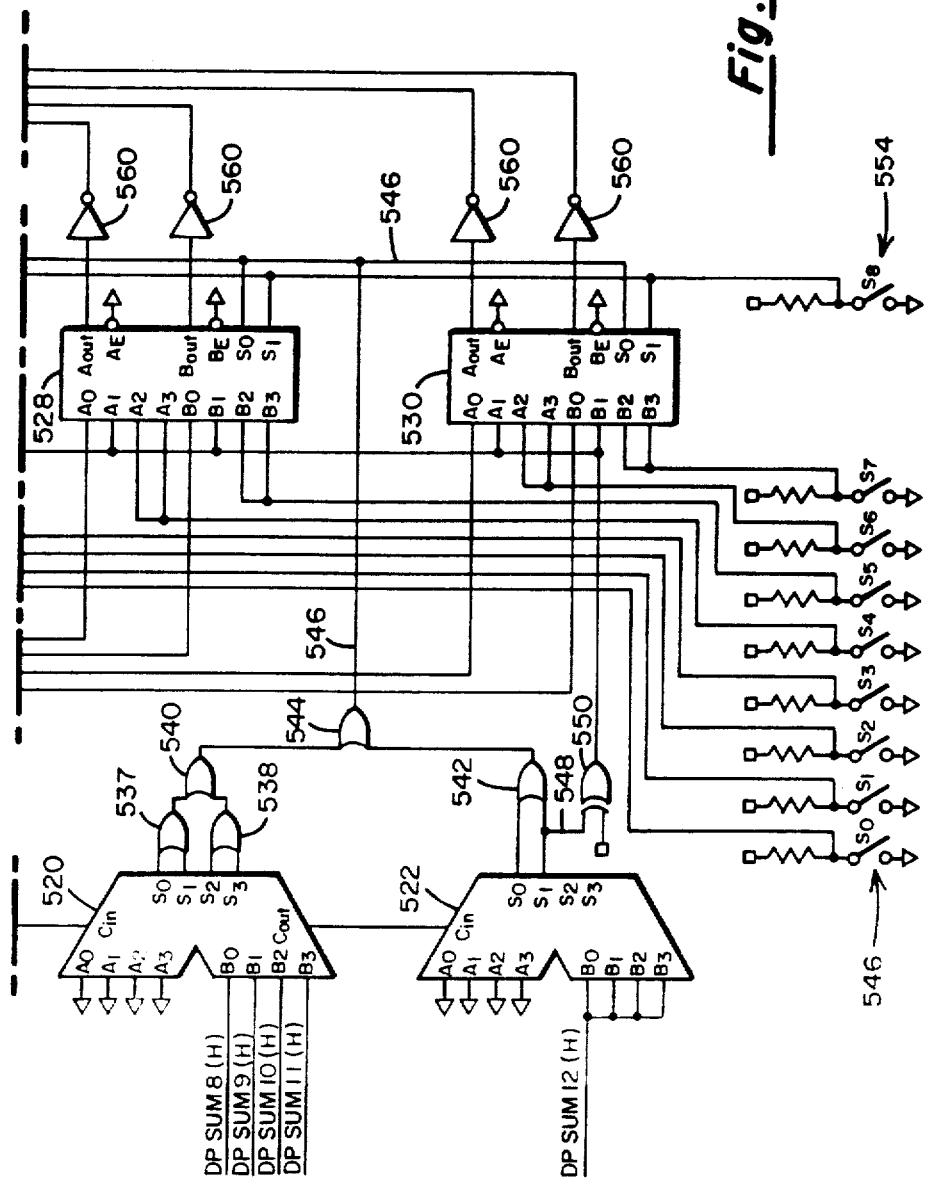

FIGS. 10a and 10b depicts a section of the power converter which receives the integral sum, or ISUM$_1$–ISUM$_7$ signals from the lines 508 and 510 of FIG. 9 and the summation bits DPSUM$_0$–DPSUM$_{12}$ from the differential and proportional signals which appear on the lines 461 from the outputs of the AND gates 460 of FIG. 8. The ALUs 516–522 are utilized to sum the 8-bit integral sum bits and the 13-bit differential and proportional bits. The four least significant bits of the integral sum bits, ISUM$_0$–ISUM$_3$, are supplied to the A$_0$–A$_3$ input terminals of the ALU 516, and the four most significant bits, ISUM$_4$–ISUM$_7$, are applied to the A$_0$–A$_3$ input terminals of the ALU 518. The four least significant bits of the differential and proportional sum signals (DPSUM$_0$–DPSUM$_3$) are supplied to the B$_0$–B$_3$ input terminals of the ALU 516, and the next four least significant bits DPSUM$_4$–DPSUM$_7$ are supplied to the B$_0$–B$_3$ input terminals of the ALU 520. All of the A input terminals of the ALU 518 are coupled to a LOW logic level. The most significant bit, DPSUM$_{12}$ is coupled to all of the B$_0$–B$_3$ input terminals of the ALU 522 while all of the A$_0$–A$_3$ input terminals of this ALU are coupled to a LOW logic level. The DPSUM bit 13 represents the sign bit for the sum of the discrete and proportional error signals. It is supplied from the lower most one of the AND gates 460 of FIG. 8b on the line 463.

Four dual decoders 524–530 receive the outputs of the ALU units 516–520 in a predetermined pattern, starting with the least significant bit from the output S$_0$ of the ALU 516 on the line 530 which is applied to the A$_0$, or least significant bit, input of the decoder 524. The next least significant bit is supplied on the line 532 to the B$_0$ input terminal of the decoder 522, and the following least significant bit is coupled from the A2 output to the A$_0$ input of the decoder 524 on the line 534. The S$_3$ output of the ALU 514 for the next least significant bit is supplied on the line 536 to the $B_0$ terminal of the decoder 524. This pattern is repeated for the outputs of the ALU 518 which are coupled to the decoders 526 and 528.

LOW level, or grounded inputs, applied to the terminals 532, 534 enable the decoder 524. This decoder has its $S_0$ input permanently enabled whereby the decoder 524 may be selected by a HIGH level on the line 546 which is derived from the outputs of the ALUs 520 and 522. The $S_0$ and $S_1$ outputs of the ALU 520 are coupled to an OR gate 537, while the $S_2$ and $S_3$ outputs are coupled to another OR gate 538. The outputs of the two OR gates 537 and 538 are coupled to a third OR gate 540. Similarly, the $S_0$ and $S_1$ outputs of the ALU 522 are coupled to an OR gate 542. The outputs of both of the OR gates 540 and 542 are coupled to another OR gate 544 which is connected on the line 546 to the $S_0$ selection input of the decoders 524–530. The OR gate 544 provides a HIGH level on the selection line 546, whenever an overflow occurs which is indicated by any of the bits $DPSUM_8$–$DPSUM_{12}$ being at a HIGH level.

Although 13 summation bits are employed to allow for multiplication by the selected multiplication factors $K_I$ and $K_D$, overflow will be detected when the $S_0$ bit of ALU 520, or any higher ordered bit of the differentiated, proportional and integral summation signal, is a HIGH level. The 14th bit, $S_1$ of ALU 522, is utilized to indicate whether the error overflow condition is associated with a positive or negative number. If the overflow condition is for a positive number, a LOW signal will appear on the line 548 to the EXCLUSIVE-OR gate 550. The other input of the EXCLUSIVE-OR gate 550 is permanently coupled to a HIGH level at the terminal 551. The EXCLUSIVE-OR gate 550, therefore, will produce a LOW output on the line 552 whenever a signal on the line 548 is at a HIGH level, and it will produce a HIGH level on the line 552 whenever the input on the line 548 is at a LOW level. the signal on the line 552, which is connected to the $A_1$ and $B_1$ inputs of the decoders 524–530, results in the production of either all HIGH output signals on the output lines of the decoders 524–530, when there is a positive overflow, on all LOW output signals, when there is a underflow, on these output lines.

The switch 554 is a manual-automatic switch, which when closed places the device in the automatic mode so that the digital signals received from the ALU units 516–522 control the power converter. When the switch 554 is open, the decoders 524–530 provide logic levels according to the setting of the switches 546, where the switch $S_7$ indicates the most significant bit. When any of the switches $S_0$–$S_7$ are open, they are representative of a logic HIGH level. The level provided by the switch $S_0$ is connected to both the $A_2$ and $A_3$ inputs of the decoder 524, while the level provided by the switch $S_1$ is connected to both the $B_2$ and $B_3$ inputs. A corresponding pattern is followed in conjunction with the rest of the switches 546. When the switch 554 is open the input bits are derived from the manually operated 546.

The outputs of the decoders 524, 526, 528 and 530 are supplied through the inverters 560 to the active LOW $D_0$–$D_7$ input terminals of the latch 562. The clear signal on the line 184 is also supplied active LOW clock input terminal of the latch 562. The $Q_0$–$Q_7$ outputs of the latch 562 provide the updated proportional, integral and differential error bits ($PID_0$–$PID_7$) which are coupled to the latch 210 to provide duty ratio control for the power converter.

Figure 11A:
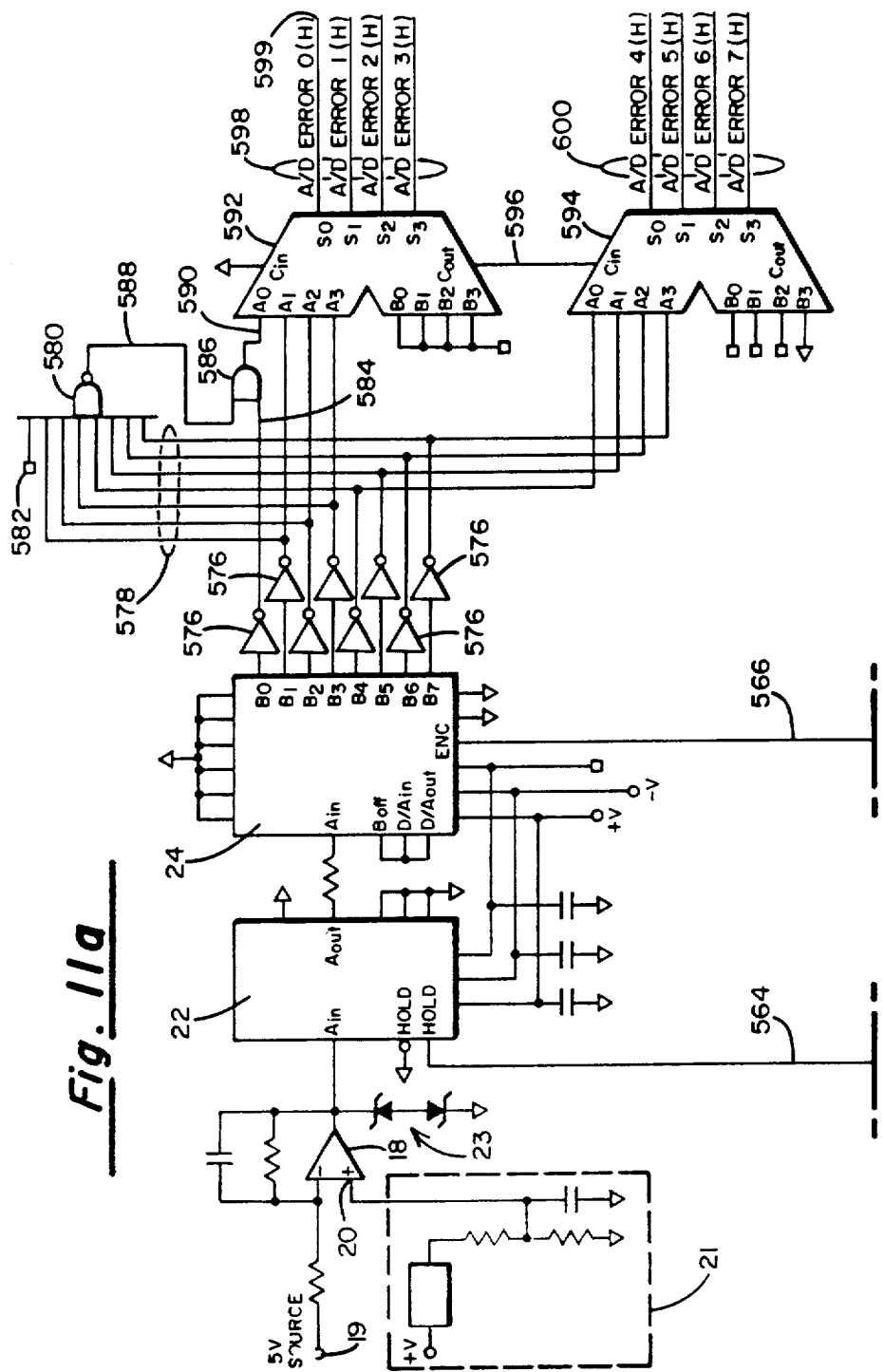
Figure 11B:
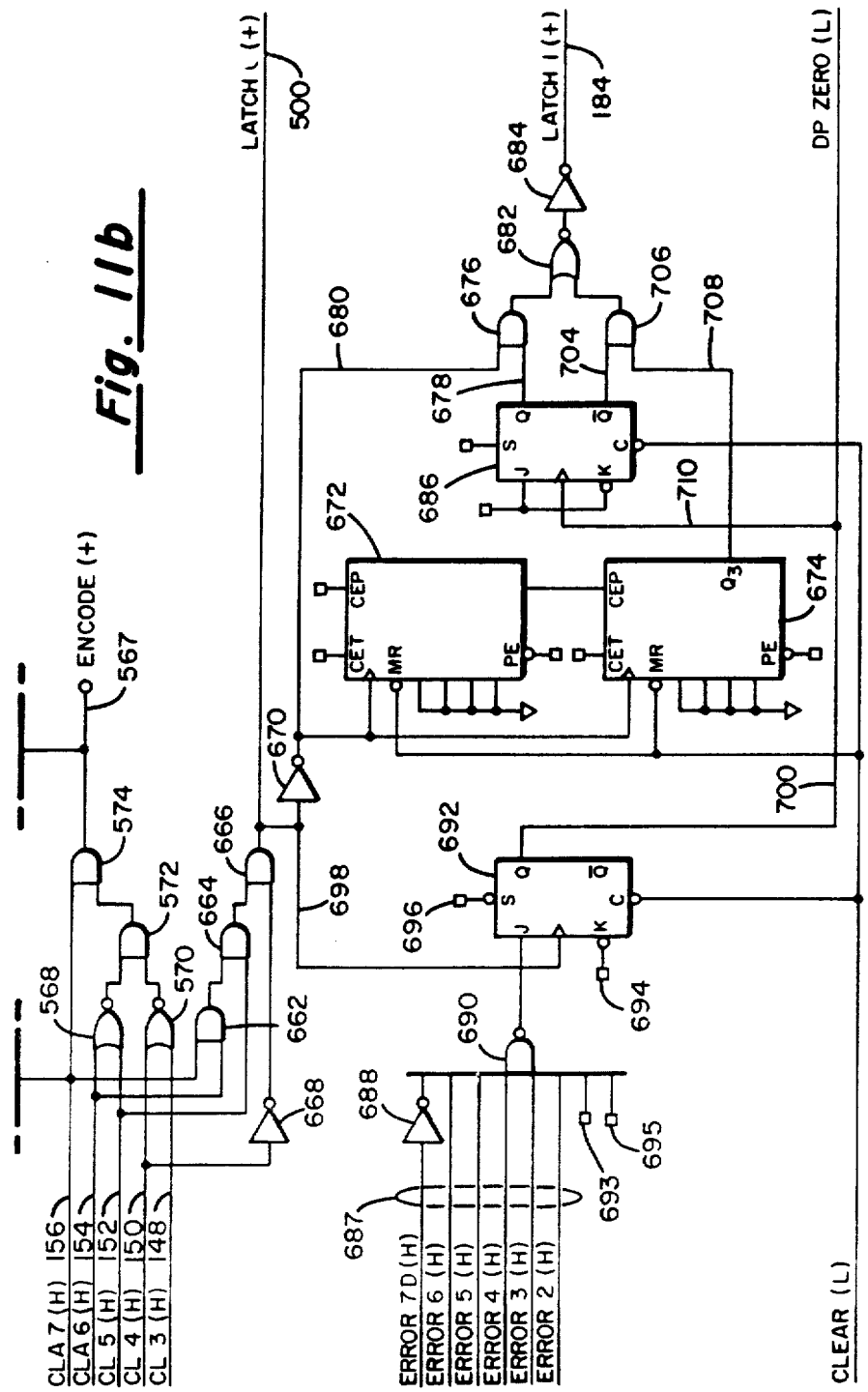
Figure 12:
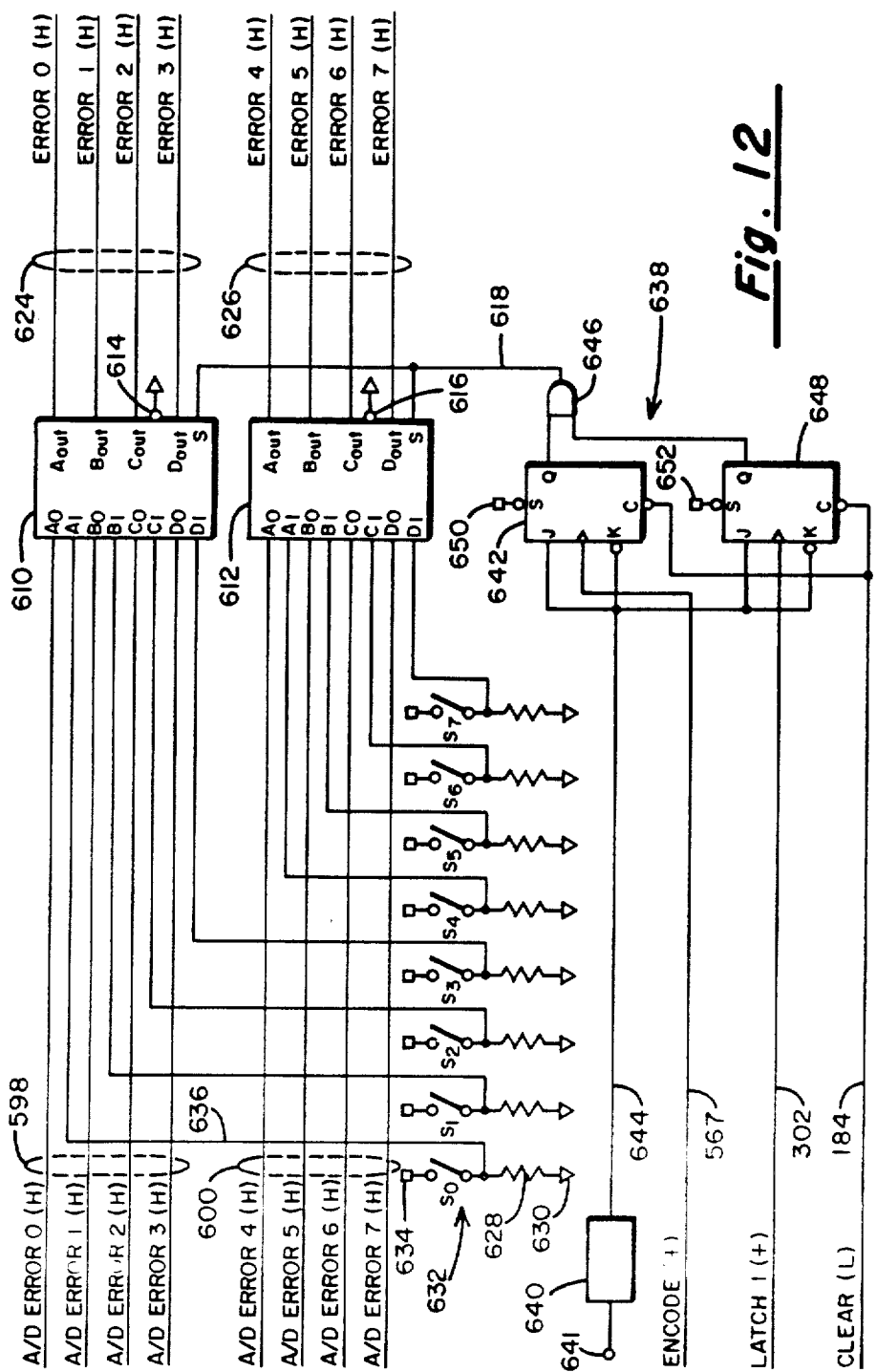

FIGS. 11a and 11b show the differential amplifier 18 which develops the analog error signal by comparison of the voltage developed across the load resistor of the switching regulator, which is applied on the terminal 19 to the inverting input terminal of the differential amplifier 18, with the reference voltage that is supplied to the terminal 20 by the voltage supply 21. The outputs of the amplifier 18 is supplied to the sample-and-hold circuit 22 across the voltage limiting zener diodes 23 to the output of the A/D converter 24. The sample-and-hold predetermined times in the timing cycle, in accordance with the signal supplied on the line 564 to the enable terminal of the sample-and-hold circuit 22, and on the line 566 to the enable terminal of the A/D 24.

The enabling signal for the sample-and-hold circuit 22 is the $CLA_7$ clock signal which is provided on the line 156 of FIG. 3. The enabling signal for the A/D converter 24 is developed through the NOR gates 568, 570 and the AND gates 572, 574. The inputs for these gates are derived from the $CLA_7$ timing signal on the line 156, the $CLA_6$ timing signal on the line 154 and the CL3–CL5 signals developed on the lines 148–152. The NOR gate 568 will be at a HIGH level when both the CLA6 and CL5 signals are at a LOW level. Correspondingly, the NOR gate 570 will be at a HIGH level when both the CL4 and CL3 timing signals are at a LOW level. The output of the AND gate 572 will, therefore, be at a HIGH level when all of the signals on the lines 148–154 are at a LOW level. The output of the AND gate 574 which supplies the enable signal on the line 566, then is HIGH when the CLA7 signal on the line 156 is HIGH and all of the other input lines 148–154 are LOW.

The $B_0$–$B_7$ outputs of the A/D converter 24 are coupled through the inverters 576 so that all of the outputs $B_1$–$B_7$ of the A/D converter 24 are supplied on the lines 578 to inputs of the NAND gate 580. Another input of the NAND gate 580 is coupled to a permanent HIGH level on the line 582. The least significant bit $B_0$ is coupled on the line 584 to one input of the AND gate 586. The output of the NAND gate 580 is coupled on the line 588 to the other input of the AND gate 586 on the line 590 represents the least significant bit employed in the A/D conversion. The value of the digitized error may vary from a count of −128 to +127 which signifies the range of negative and positive voltage variations from the reference voltage that may be controlled. For example, a twos complement count of +127 may represent a positive voltage of 4.64 volts while a count of −128 may represent a positive voltage of 5.36 volts, wherein equal positive and negative excursions may be detected around a nominal voltage of 5.00 volts.

The $B_1$–$B_3$ output bits of the A/D converter 24 are supplied to the $A_1$–$A_3$ inputs of the ALU 592. The carry in, or $C_{IN}$, terminal of the ALU 592 is connected to ground, or a LOW level. The carry out, or $C_{OUT}$, terminal of the ALU 592 is connected to the $C_{IN}$ terminal of the ALU 594 on the line 596. The output bits $B_4$–$B_7$ of the A/D converter 24 are connected to the $A_0$–$A_3$ inputs of the ALU 596. All of the $B_0$–$B_3$ inputs of the ALU 592 are connected to a logic HIGH level while the $B_0$, $B_1$ and $B_2$ inputs of the ALU 596 are connected to a logic HIGH level while the $B_0$, $B_1$ and $B_2$ inputs of the ALU 596 are connected to a HIGH level, and the $B_3$ input is connected to a LOW level. The subtractor formed of the ALUs 592 and 596 subtractors the values of the signals appearing on the $A_0$–$A_3$ inputs from the 0111 1111, or +127, value that is supplied to the B inputs. The output of the ALU units 596 represent the A/D ERROR$_0$–A/D ERROR$_3$ bits on the lines 598, while the A/D ERROR$_4$–A/D ERROR$_7$ bits are supplied on the lines 600. The output on the lines 598, 600 is a twos complement representation of the analog error signal produced by the differential amplifier 18.

If all of the output bits $B_0$–$B_7$ of the A/D converter are the ground or LOW level state, the outputs of the inverters 576 will be at a HIGH level and all of the inputs $A_1$–$A_3$ of the ALU 592 and $A_0$–$A_3$ of the ALU 596 will be at a HIGH level. In addition, if all of the signals on the lines 578 are also at a HIGH level, the output of the NAND gate 580 on the line 588 will be at a LOW level, and the output of the AND gate 586 on the line 590 to the $A_0$ input of the ALU 592 will also be at a LOW level. The signal on the A input terminals for the above described condition represents a positive 127 in twos complement notation, which when subtracted from the set +127 representation on the B input terminals will cause LOW level signals to appear on all of the output lines 598 and 600. When this condition occurs it indicates that the voltage on the line 19 is equal to the voltage of the reference source on the line 20.

In twos complement notation the value zero is represented by all 0s. For example, 0000 0000 is an 8-bit twos complement representation of the value zero. Positive numbers are obtained with the 0s complement notation by starting with the least significant bit so that, for example, a decimal 8 will be represented by 000 1000. The positive number count will then continue until the first seven least significant bits are representative of a logic "1", which is a HIGH level in the present embodiment, and the eighth bit is at a LOW, or "0" logic level. As previously mentioned, this represents a count of +127. Negative numbers are obtained in the twos complement system by inverting all of the "0" bits to a "1" and the "1" bits to a "0", and then adding 1 to the least significant bit. Thus, the complement of a decimal 8 is 111 0111. When a 1 is added to the least significant bit of this number, the resulting twos complement negative 8 number is represented by 111 1000.

The NAND gate 580 and the AND gate 586 are provided to prevent the subtractor from recognizing the existence of and output from the A/D converter 24 when the $B_0$ output is at a logic "1" (HIGH) level and the $B_1$–$B_7$ outputs are all at a logic "0" (LOW) level. The permanent HIGH or "1" level that is supplied by the line 582 ensures that the NAND gate 580 will remain at a logic HIGH level as long as any of the signals on the lines 578 are at a logic LOW level. This allows the output of the AND gate 586 to follow the level of the $B_0$ bit output by the A/D converter 24 for all conditions except when all of the lines 578 are at a HIGH, or logic "1", level. If all of the lines 578 are at a HIGH level the output of the NAND gate 580 goes to a LOW level and the AND gate 586 supplies a LOW level to the $A_0$ input of the ALU 592. In this instance the output bits of the A/D converter are 1111 1110, the complement of which is 000 0001. The AND 586, therefore, produces a HIGH, or "1", level output on the line 590 whenever bit $B_0$ of the A/D converter 24 is at a LOW, or "0" level in order to add a count of 1 to the least significant bit of the number, except when all of the lines 578 are at a HIGH level.

A count of +128 is represented as 1000 0000 and the complement of this number is 0111 1111, in twos complement notation. Adding 1 to the least significant bit would again result in a count of 1000 000. For this reason the positive count is limited to +127 and a negative count of −128 is equal to 1000 000. The AND gate 586 is employed to prevent the addition of a count of 1 to the least significant bit when the bits on the $B_0$–$B_7$ inputs of the A/D converter 24 are all at logic LOW, or "0", levels. In the circuitry of the described embodiment a positive count of "1" or 0000 0001 will also result in a LOW level being supplied by the AND gate 586 on the line 590, which means that the subtractor formed of the ALUs 592 and 596 will provide an A/D ERROR$_0$ output bit on the line 599 when the $B_0$ signal is the only signal from the A/D converter 24 that is at a logic "1" level. However, the minimal error represented by this condition is not recognized by the circuitry in order to achieve circuit simplification, as described below.

The A/D ERROR$_0$–A/D ERROR$_7$ bits are transmitted on the lines 598, 600 to the quad one-of-two decoders 610, 612 of FIG. 11. The A/D ERROR$_0$ A/D ERROR$_3$ bits are respectively coupled to the $A_0$, $B_0$, $C_0$ and $D_0$ inputs of the decoder 612. The enable terminals 614 and 616 of the decoders 610 and 612, respectively are permanently coupled to a LOW, or ground, level signal which permanently enables these decoders. The selection line 618 calls for selection of either the A/D error signals on the lines 598, 600 or the inputs from the switches 620. When the selection line 618 is at a LOW level the input terminals $A_0$, $B_0$, $C_0$ and $D_0$ are selected which provides digital output signals on the lines 624, 626, which correspond to the input signals on the lines 598, 600.

The manually set switches 632 (also labeled $S_0$–$S_7$) which are coupled to the terminals $A_1$, $B_1$, $C_1$ and $D_1$ are each associated with a resistor 628 that is coupled between a ground terminal 630, a selector switch 632, and a voltage terminal 634. When the selector switch is open a LOW logic level signal is supplied on the corresponding line, such as the line 636. When a switch 632 is closed a HIGH level signal is coupled from the voltage terminal 636 to the line 634. The switch $S_7$ is the most significant bit switch, and it used to represent the sign of the value designated by the selected switches 632 and will generally be closed to provide a negative error signal. The switches 632 are set in conjunction with an overcurrent control 638 constructed so that when an overcurrent condition exists the overcurrent control 638 provides a HIGH level on the line 618, which in turn provides output signals on the lines 624, 626 that are determined in accordance with the setting of the switches 632. The setting of the switches $S_0$–$S_6$ determine the magnitude of the error signal. The reference voltage is supplied to the non-inverting input terminal on the terminal 20 of the amplifier 18, and the sensed signal for the power converter is supplied on the terminal 19. A negative error signal, corresponding to a closed $S_7$ switch, means the sensed voltage exceeds a desired voltage and the duty ratio of the output of the converter is to be decreased to reduce the overcurrent condition.

In the absence of an overcurrent condition, the A/D error signals on lines 598, 600 pass through the decoders 610, 612 to the output lines 624, 626. If the overcurrent sensor 640 senses an overcurrent condition on the sensor inputs 641 indicating that one or more of the outputs of the power converter is in an overcurrent condition, it will provide a HIGH level to the J input of the JK flip-flop 642 on the overcurrent line 644, which is also coupled to an active LOW K input of the flip-flop 642. Since the flip-flop 642 has been initially cleared by the signal on the clear line 184 the Q output of the flip-flop 642 will initially be at a LOW level. However, if a HIGH level signal is present on the line 644, indicating an overcurrent condition, the flip-flop 642 will change its state upon the occurrence of a HIGH level on the line 567 from FIG. 11. The Q output of the flip-flop 642 is coupled to one input of the AND gate 646, and the other input of the AND gate 646 is coupled to the Q terminal of the flip-flop 648. Since the flip-flop 648 is also initially cleared by the signal on the clear 184, its Q output terminal will initially be at a LOW level. The overcurrent signal on the line 644 is supplied both the J and the K input terminals of the flip-flop 648, wherein the J input terminal is active on a HIGH input and the K input terminal is active on a LOW input.

Timing signals for the clock input of the flip-flop 642, 648 are supplied on the Latch 1 line 302 which is periodically pulsed under control of the circuitry of FIG. 11, and the Encode signal on the line 567. The timing of the Latch 1 signal on the line 302 is such that the Encode signal appears first and the Latch 1 signal appears approximately one-quarter cycle time later with respect to the output of the oscillator 61. The reason for using both of the flip-flops 642 and 648, and both the Encode and Latch 1 signals for timing is to ensure that when an overcurrent condition is sensed by the sensor 640 that it is not a transient condition, but is one which lasts for a predetermined minimum amount of time before the flip-flops 642, 648 will change states. After the flip-flop 648 have been triggered and its Q output terminal is at a HIGH level and the AND gate is satisfied a HIGH signal is supplied on the line 681 which directs the decoder 610, 612 to select the switches 632 as input bits. Both of the flip-flops 642, 648 have their set input terminals 650, 652 permanently coupled to a HIGH level.

Referring again to FIG. 11, it is seen that there are three AND gates 662, 664 and 666 which are coupled to receive inputs from the lines 150-156 that are used to provide the Latch 0 timing signal on the line 500. The CLA7 and CLA6 signals are coupled to the AND gate 662 so that when both of these are at a HIGH level the output of the AND gate 662 is at a HIGH level. The AND gate 664 receives the output of the AND 662 and also at its other input the CL5 signal on the line 152. The output of the AND 664, therefore, indicates that all three of the signals CLA7,, CLA6 and CL5 are present. The AND gate 666 has one input coupled to the output of the AND gate 664 and the other input is coupled to the output of the AND gate 664 and the other input is coupled to the output of an inverter 668, the input of which is derived from CL4 on the line 150. The output of the AND gate 666, therefore, is a timing signal which is present whenever CLA7, CLA6, and CL5 are all at a HIGH level and CL4 is at a LOW level. The output of the AND gate 666 is inverted by the inverter 670 and is supplied as a clocking signal to the counter stages 672, 674 which are connected in cascades.

The counter formed of counter stages 672, 674 is a 256 stage counter which is used during the initial soft-start turn-on power energization phase. Assuming that the power converter has been on for some time, and that it is not in the initial soft-start stage, the AND gate 676 will be supplied a HIGH level input on the line 678 that is coupled to the Q output of a flip-flop 686. The signal on the other ine 680 which is connected to the other input of the AND gate 676 thus follows the output of the inverter 670, as does the output of the AND gate 676. The output of the AND 676 is coupled to a NOR gate 682. If a HIGH level signal is present on the output of the AND gate 676, the output of the NOR gate 682 will be at a LOW level, and such a LOW level will be inverted by inverter 684 and supplied is a HIGH level Latch 1 signal on the line 184, when the appropriate clock timing conditions are realized.

During the initial turn-on time of the power converter, the flip-flop 686 is cleared by the Clear signal on the line 184. When flip-flop 686 is clear the Q output on the ine 678 will be at a LOW level, which blocks signals from passing through the AND gate 676. The ERROR$_7$–ERROR$_2$ signals on the lines 687 represent the difference between the voltage sensed by the differential amplifier 18 and the actual voltage of the circuit. The ERROR$_7$ bit is the sign bit for the detected error, and it will be at a LOW level when a positive error signal is present. A positive error signifies that the reference voltage is greater than the output voltage of the power converter. Upon initial turn-on, therefore, the error signal is positive and a LOW level signal is supplied to the input of the inverter 688. The output of the inverter 688 and the lines which receive the error bits ERROR$_6$–ERROR$_2$ are supplied to the inputs of a NAND gate 690. The NAND gate 690 also has input lines 693, 695 which are permanently coupled to HIGH levels. When all of the inputs of the NAND 690 are HIGH the output of the NAND gate 690 will be LOW, which occurs when the error signal is between an error count of 124–127.

When the error count signal drops below a count of 124, the NAND gate 690 couples a HIGH level to the J input terminal of the flip-flop 692. The K input terminal of the flip-flop 692 is coupled on the line 694 to a permanent HIGH logic level. A set input terminal which is an active LOW terminal like the K input terminal, $S_1$, is coupled to a permanent HIGH on the line 696. The output of the AND gate 666 is coupled on the line 698 to the timing clock input terminal of the flip-flop 692. Thus, upon the output of the NAND gate 690, the flip-flop 692 will follow the signal that appears on the line 698 and will produce pulsating signals on the Q output terminal which is supplied on the line 700 as a clocking signal for the flip-flop 686. The flip-flop 686 has its J and K terminals coupled to a voltage terminal 702 which provides a HIGH level to these terminals.

Since the J terminal is an active HIGH terminal and the K terminal is an active LOW terminal, the flip-flop 686 will remain in its initial cleared state so that the Q output will provide a HIGH level on the line 704 to the input of the AND gate 706. After both the Clear on a line 184 has been released (by going to a HIGH level) and the error signal on the lines 687 has dropped below a count of 124, the switching of the flip-flop 692 to provide an output signal on the line 700 causes the flip-flop 686 to change its state. The counter consisting of the counting states 672, 674 is a divide counter which divides the pulses on the output of the inverter 670 by 256.

The Q output of the flip-flop 692 is also supplied on the line 700 as the DPZERO signal to inhibit the differential and proportional branches initially so that only the integral branch is effective during the soft-start condition. The output of the counter stages 672, 674 occurs on the line 708 which is supplied to an input of an AND gate 706. The AND gate 706 is satisfied and a HIGH level is coupled through the NOR gate 682 and the inverter 684, thereby generating a HIGH Latch 1 signal. In this manner the power converter is prevented from being enabled until the positive error signal has dropped below a value of 124 in order to provide the soft-start function. After the counter stages 672, 674 have timed out, they are cleared back to zero by a clear signal on the ine 710, which is coupled to the Clear line 184.

TABLE 1

| $S_1$ | $S_3$ | $S_2$ | FUNCTION ($K_D$) |
|---|---|---|---|
| Closed | Closed | Closed | X1 |
| Closed | Closed | Open | X2 |
| Closed | Open | Closed | X4 |
| Closed | Open | Cpen | X8 |
| Open | Open/Closed | Open/Closed | X0 |

TABLE 2

| | 410 | | 408 | | 406 | | 404 | | 402 | | 400 | | FUNCTION ($K_D$) |
|---|---|---|---|---|---|---|---|---|---|---|---|---|---|
| INPUTS | $B_0$ | $A_0$ | $B_0$ | $A_0$ | $B_0$ | $A_0$ | $B_0$ | $A_0$ | $B_0$ | $A_0$ | $B_0$ | $A_0$ | X1 |
| OUTPUT BITS | $D_8$ | $D_8$ | $D_8$ | $D_8$ | $D_7$ | $D_6$ | $D_5$ | $D_4$ | $D_3$ | $D_2$ | $D_1$ | $D_0$ | |
| INPUTS | $B_1$ | $A_1$ | $B_1$ | $A_1$ | $B_1$ | $A_1$ | $B_1$ | $A_1$ | $B_1$ | $A_1$ | $B_1$ | $A_1$ | X2 |
| OUTPUT BITS | $D_8$ | $D_8$ | $D_8$ | $D_7$ | $D_6$ | $D_5$ | $D_4$ | $D_3$ | $D_2$ | $D_1$ | $D_0$ | LOW | |
| INPUTS | $B_2$ | $A_2$ | $B_2$ | $A_2$ | $B_2$ | $A_2$ | $B_2$ | $A_2$ | $B_2$ | $A_2$ | $B_2$ | $A_2$ | X4 |
| OUTPUT BITS | $D_8$ | $D_8$ | $D_7$ | $D_6$ | $D_5$ | $D_4$ | $D_3$ | $D_2$ | $D_1$ | $D$ | LOW | LOW | |
| INPUTS | $B_3$ | $A_3$ | $B_3$ | $A_3$ | $B_3$ | $A_3$ | $B_3$ | $A_3$ | $B_3$ | $A_3$ | $B_3$ | $A_3$ | X8 |
| OUTPUT BITS | $D_8$ | $D_7$ | $D_6$ | $D_5$ | $D_4$ | $D_3$ | $D_2$ | $D_1$ | $D_0$ | LOW | LOW | LOW | |

TABLE 3

| $S_2$ | $S_1$ | FUNCTION |
|---|---|---|
| Closed | Closed | Divide by 1 |
| Closed | Open | Divide by 16 |
| Open | Closed | Divide by 32 |
| Open | Open | Divide by 64 |

TABLE 4

| | Decoders | | | | | | | | | | FUNCTION |
|---|---|---|---|---|---|---|---|---|---|---|---|
| | 478 | | 476 | | 474 | | 472 | | 470 | | |
| INPUTS | $B_0$ | $A_0$ | $B_0$ | $A_0$ | $B_0$ | $B_0$ | $B_0$ | $A_0$ | $B_0$ | $A_0$ | −8 |
| OUTPUT BITS | $E_{12}$ | $E_{11}$ | $E_{10}$ | $E_9$ | $E_8$ | $E_7$ | $E_6$ | $E_5$ | $E_4$ | $E_3$ | |
| INPUTS | $B_1$ | $A_0$ | $B_1$ | $A_1$ | $B_1$ | $A_1$ | $B_1$ | $A_1$ | $B_1$ | $A_1$ | −16 |
| OUTPUT BITS | $E_{13}$ | $E_{12}$ | $E_{11}$ | $E_{10}$ | $E_9$ | $E_8$ | $E_7$ | $E_6$ | $E_5$ | $E_4$ | |
| INPUTS | $B_2$ | $A_2$ | $B_2$ | $A_2$ | $B_2$ | $A_2$ | $B_2$ | $A_2$ | $B_2$ | $A_2$ | −32 |
| OUTPUT BITS | $E_{14}$ | $E_{13}$ | $E_{12}$ | $E_{11}$ | $E_{10}$ | $E_9$ | $E_8$ | $E_7$ | $E_6$ | $E_5$ | |
| INPUTS | $B_3$ | $A_3$ | $B_3$ | $A_3$ | $B_3$ | $A_3$ | $B_3$ | $A_3$ | $B_3$ | $A_3$ | −64 |
| OUTPUT | $E_{15}$ | $E_{14}$ | $E_{13}$ | $E_{12}$ | $E_{11}$ | $E_{10}$ | $E_9$ | $E_8$ | $E_7$ | $E_6$ | |

The converter of FIG. 1b, which is the slave converter of the master/slave pair in the representative embodiment, is identical to the converter of FIG. 1a and all of the similar associated elements of the slave converter are indicated with the same primed element number. The slave converter of FIG. 1b uses the same load resistor 76 as does the master converter of FIG. 1a. Voltage pulses are supplied to the load resistor 76 by the switching regulator 12' via the diode 23'. The output current labeled $I_{OUT}$ on the line 29 from the converter 10 is coupled to a sensing control unit 31 on the line 33 as is the current $I_{OUT2}$ on the line 35 from the power converter 10'. The sensing control unit 31 controls the operation of a signal controlled switch 57 of a type known in the prior art, which has three positions, A, B and C.

During normal operation, the switch will be in position A which will allow the digital output signal on the lines 56 to be coupled to ALUs unit 59 and 59'. Digital signal carrying lines in the figures may represent a plurality of lines, as necessary to carry the required digital signals. Thus, in the normal operating mode when both of the power converters are operating, the master converter 10 supplies digital signals to both of the ALU units 59 and 59'. In this instance the digital output signals on the lines 56' will not be supplied to the ALU 59', and the power converter 10' will operate as a slave under the control of the master converter 10. A failure of the power converter 10 is sensed by a lack of the $d_n$ signal on the lines 27, and the sensing control unit then will switch control to the slave converter 10' by connecting the switch 57 to position B.

When the switch 57 is in position B, the digital output signal from the slave converter will be supplied on the lines 56' through the ALU 59' and the control will be provided by the former slave unit 10'. On the other hand, if the slave unit 10' should fail, then the master unit 10 will be the only unit in operation, and lack of the $d_{n2}$ signal on the lines 56' will cause the switch 57 to switch to position C. With the switch 57 in position C, $d_{n1}$ digital signals on the lines 56 will be supplied to the ALU 59, and the master converter will be the only converter supplying current to the load.

The sensing control unit 31 may also be used to switch from a power sharing mode to a single power converter supply mode if one of the switching regulators 12 or 12' should fail or become unreliable. Conventional monitoring circuits may be used in the switching regulators 12 and 12' to provide control signals on the lines 13 and 13' to the sensing control unit 31 to accomplish this result. In addition, monitoring of the input power source or sources may provide signals on the lines 15 and 15' which can shut down one or both of master and/or slave converters in the event of input power faults.

As previously mentioned, the adjustment of duty ratios in the master and slave converter arrangement of the present invention requires that both the positive ($b_n$) and the negative digital ($-b_n$) offset values be provided. The digital offset value is added to the digital value supplied to one of the ALU units 59, 59', and is subtracted from the other. For example, assuming that the digital offset signal is subtracted from the digital signal on the lines 56 so that the actual digital signal to the comparator 59 is $d_{n1}-b_n$, the signal utilized by the comparator 58' will then be $d_{n1}+b_n$ during normal parallel operations.

The circuitry for supplying the two offset signals is shown in FIG. 1c. $I_{OUT1}$ and $I_{OUT2}$ are supplied to the inverting input terminals 70 and 72 of the current comparator 74, respectively. The output of the current comparator 74 supplies the load as indicated by the resistor $R_L$ 76. The analog output of the current comparator 74 is supplied to a analog-to-digital converter (A/D) 78, the output of which represent the difference $I_{OUT2}-I_{OUT1}$ is supplied to a third PID controller 80. The PID converter 80 is constructed in a manner similar to that of the PID controllers used in the master controller 10 and the slave converter 10'. Where the element numbers are the same, they are double primed. The output of the PID 80 on the lines 56" represents the $+b_n$ offset signal, and a set of inverter(s) 82 are utilized to invert the appropriate sign bit, or bits, of the digital signal to provide a negative digital representation $-b_n$. The positive digital representation $b_n$ is supplied on the lines 84, and the negative digital representation $-b_n$ is supplied on the lines 86. The positive digital signal $b_n$ on the lines 84 is supplied to the ALU 59', so the ALU 59' can add the signal $d_{n1}$ to it when the system is operating in a normal power sharing configuration. During normal operation, when power sharing is occurring, the $-b_n$ signal on the line 86 is supplied on the lines 86 to the ALU 59 that it can be subtracted from the signal $d_{n1}$ to control the master converter. As previously mentioned with this arrangement, the instantaneous average duty ratio used in the two converter systems will be independent of the offset value and the average digital signal will be equal the digital signal $d_{n1}$.

When one of the power converters 10 or 10' fails, the sensing control unit 31 also supplies a control signal on the line 86 which signals the digital-to-analog converter 78, or in another suitable manner inhibits the operation of the PID 80 so that the offset value $b_n$ goes to zero during the time that a single power converter is in operation.

I claim:

1. A power converter having a quantized duty ratio output comprising
    first converter means,
    second converter means,
    and control means,
    wherein said first and said second converter means each comprise digitally controlled quantized duty ratio output means coupled to share the output load when both converters are operational, each of said converter means are capable of supplying the load alone should the other converter fail to operate, and both of said converter means comprise duty ratio quantization-adjustment means which is responsive to digital offset signals, and said control means comprises means for supplying a first offset signal to one of said converter means and a second offset signal to the other of said converter means, said offset signals being employed by said converter means to decrease the quantized duty ratio of one converter means and to increase the quantized duty ratio of the other converter means relative to a nominal quantized duty ratio when both converters are operational, and said control means is further constructed to switch a failed one of said converter means from supplying said load and to simultaneously reduce to zero the offset signal that is supplied to the remaining converter means.

2. A power converter as claimed in claim 1 wherein said first digital offset signal has a value equal to the negative of said second digital offset signal.

3. A power converter as claimed in claim 1 wherein said digitally controlled quantized duty ratio output means comprise proportional-integral-differential ratio regulation means.

4. A power converter as claimed in claim 3 wherein said first digital offset signal has a value equal to the negative of said second digital offset signal.

5. A power converter as claimed in claim 1 wherein said control means comprises
    circuit means for sensing and comparing the outputs of said first and second converter means and for developing an analog signal representative of the difference between said outputs, analog-to-digital conversion means coupled to said circuit means for producing first digital signals that are proportional to said analog signal during a measurement interval, integrating means coupled to said analog-to-digital conversion means for producing second digital signals that are proportional to the addition of said first digital signals during said measurement interval and the summation of said first digital signals obtained during preceding measurement intervals, and differentiating means coupled to said analog-to-digital conversion means for producing third digital signals that are proportional to the subtraction of said first digital signals obtained during the immediately preceding measurement interval from said first digital signals of said measurement interval and summation means for summing said first, second and third digital signals and for providing said first and second offset signals.

6. A power converter as claimed in claim 5 wherein said first digital offset signal has a value equal to the negative of said second digital offset signal.

7. A power converter comprising first and second converter means wherein each of said converter means comprises
    a D.C. switching regulator and control means for regulating the duty cycle of said switching regulator comprising circuit means for sensing and comparing the output of said switching regulator with a reference and for developing an analog signal representative of the difference between said output and said reference, analog-to-digital conversion means coupled to said circuit means for producing first digital signals that are proportional to said analog signal during a measurement interval, integrating means coupled to said analog-to-digital conversion means for producing second digital signals that are proportional to the addition of said first digital signals during said measurement interval and the summation of said first digital signals obtained during preceding measurement intervals, and differentiating means coupled to said analog-to-digital conversion means for producing third digital signals that are proportional to the subtraction of said first digital signals obtained during the immediately preceding measurement interval from said first digital signals of said measurement interval, summation means for summing said first, second and third digital signals into error signals, timing means for producing a repetitive train of timing pulses, counter means for counting said timing pulses, comparison means coupled to said summation means and said counter means for producing an output when a comparison occurs and duty-cycle control means coupled to said comparison means and to said switching regulator for controlling the duty-cycle of said switching regulator in quantized steps in accordance with the value of adjust signals associated with each of said measurement intervals, and control means comprising offset means for supplying a first offset signal to one of said converter means and a second offset signal to the other of said converter means wherein said offset signals are employed by said converter means to decrease the quantized duty ratio of one converter means and to increase the quantized duty ratio of the other converter means with reference to a nominal quantized duty ratio when both converters are operational, and said control means is further constructed to switch a failed one of said converter means from supplying said load and to simultaneously reduce to zero the offset signal that is supplied to the remaining converter means, and combining means for combining said error signals and said offset signals to provide said adjust signals.

8. A power converter as claimed in claim 7 wherein said first digital offset signal has a value equal to the negative of said second digital offset signal.

9. A power converter as claimed in claim 7 wherein said control means comprises circuit means for sensing and comparing the outputs of said first and second converter means and for developing an analog signal representative of the difference between said outputs, analog-to-digital conversion means coupled to said circuit means for producing fourth digital signals that are proportional to said analog signal during a measurement interval, integrating means coupled to said analog-to-digital conversion means for producing fifth digital signals that are proportional to the addition of said fourth digital signals during said measurement interval and the summation of said fourth digital signals obtained during preceding measurement intervals, and differentiating means coupled to said analog-to-digital conversion means for producing sixth digital signals that are proportional to the subtraction of said fourth digital signals obtained during the immediately preceding measurement interval from said fourth digital signals of said measurement interval and summation means for summing said fourth, fifth and sixth digital signals and for providing said first and second offset signals.

10. A power converter as claimed in claim 9 wherein said first digital offset signal has a value equal to the negative of said second digital offset signal.

* * * * *

UNITED STATES PATENT AND TRADEMARK OFFICE
CERTIFICATE OF CORRECTION

PATENT NO. : 4,725,940
DATED : February 16, 1988
INVENTOR(S) : Christopher P. Henze It is certified that error appears in the above-identified patent and that said Letters Patent are hereby corrected as shown below:

Column 9, line 61, "112" should be -- 122 -- .

Column 16, lines 34 and 35, "$ISUM_1-ISUM_7$" should be -- $ISUM_1-ISUM_7$ -- .

Column 25, lines 23 and 24, "$I_{OUT2}-I_{OUT1}$" should be -- $I_{OUT2}-I_{OUT1}$ -- .

Column 9, line 39, "cause" should be -- because -- .

Column 12, line 51, "form" should be -- from -- .

Column 14, line 19, "of" should be -- or -- .

Column 18, line 68, "subtractors" should be -- subtract -- .

Column 20, line 42, "it" should be -- is -- .

Column 21, line 32, "have" should be -- has -- .

Column 22, line 6, "is" should be -- as -- .

Signed and Sealed this

Twelfth Day of July, 1988

*Attest:*

DONALD J. QUIGG

*Attesting Officer*      *Commissioner of Patents and Trademarks*